United States Patent
Goto et al.

(10) Patent No.: US 10,611,377 B2
(45) Date of Patent: Apr. 7, 2020

(54) CONTROL APPARATUS FOR VEHICULAR DRIVE SYSTEM

(71) Applicant: Toyota Jidosha Kabushiki Kaisha, Toyota-shi (JP)

(72) Inventors: Jun Goto, Nagoya (JP); Kenta Kumazaki, Anjo (JP); Masato Yoshikawa, Toyota (JP); Nobufusa Kobayashi, Anjo (JP); Hiromichi Kimura, Okazaki (JP); Kazuyuki Shiiba, Miyoshi (JP); Tooru Matsubara, Toyota (JP); Takeshi Kitahata, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 151 days.

(21) Appl. No.: 15/818,811

(22) Filed: Nov. 21, 2017

(65) Prior Publication Data
US 2018/0148064 A1    May 31, 2018

(30) Foreign Application Priority Data

Nov. 29, 2016 (JP) ................................ 2016-231855

(51) Int. Cl.
*F16H 63/50* (2006.01)
*B60W 30/18* (2012.01)
(Continued)

(52) U.S. Cl.
CPC ............ *B60W 30/19* (2013.01); *B60K 6/365* (2013.01); *B60K 6/445* (2013.01); *B60W 10/08* (2013.01);
(Continued)

(58) Field of Classification Search
CPC ................. F16H 63/502; F16H 59/72; B60W 30/18072; B60W 2510/107;
(Continued)

(56) References Cited

U.S. PATENT DOCUMENTS

| | | | | |
|---|---|---|---|---|
| 5,863,275 A | * | 1/1999 | Nozaki | B60W 10/06 477/107 |
| 5,875,865 A | * | 3/1999 | Wakahara | B60K 17/35 180/248 |
| 7,988,579 B2 | * | 8/2011 | Tabata | B60L 50/16 475/5 |

FOREIGN PATENT DOCUMENTS

| | | |
|---|---|---|
| JP | 10-47100 A | 2/1998 |
| JP | 2012-046003 | 3/2012 |
| JP | 2012-240557 A | 12/2012 |

* cited by examiner

*Primary Examiner* — Sherry L Estremsky
(74) *Attorney, Agent, or Firm* — Oblon, McClelland, Maier & Neustadt, L.L.P.

(57) ABSTRACT

A control apparatus (80) for a vehicular drive system (12; 105) having a step-variable transmission portion (20; 110) which is shifted to a selected one of speed positions having respective speed ratio values, with engaging and releasing actions of coupling devices (B, C), and a drive power source portion (39; 103) operatively connected to an input shaft (30) of the step-variable transmission portion, the control apparatus being configured to implement a speed synchronizing control upon a shift-down action of the step-variable transmission portion in a coasting run of a vehicle (10; 100), wherein an input shaft speed of the step-variable transmission portion is raised with an input shaft torque transmitted from the drive power source portion to the input shaft, from a pre-shift-down synchronizing speed to a post-shift-down synchronizing speed. The control apparatus includes a torque control portion (86) configured to change the input shaft torque transmitted from the drive power source portion (Continued)

(39; 103) to the input shaft (30) during the speed synchronizing control, on the basis of a temperature of a lubricant in the step-variable transmission portion such that the input shaft torque is larger when the lubricant temperature is comparatively low than when the temperature is comparatively high.

4 Claims, 9 Drawing Sheets

(51) Int. Cl.
| | |
|---|---|
| *B60W 30/19* | (2012.01) |
| *F16H 61/04* | (2006.01) |
| *B60K 6/445* | (2007.10) |
| *B60K 6/365* | (2007.10) |
| *B60W 10/08* | (2006.01) |
| *B60W 10/115* | (2012.01) |
| *B60W 20/00* | (2016.01) |
| *F16H 59/72* | (2006.01) |

(52) U.S. Cl.
CPC .......... *B60W 10/115* (2013.01); *B60W 20/00* (2013.01); *B60W 30/18072* (2013.01); *F16H 61/0403* (2013.01); *F16H 63/502* (2013.01); *B60W 2510/107* (2013.01); *B60W 2510/1095* (2013.01); *B60W 2520/105* (2013.01); *B60W 2710/083* (2013.01); *B60W 2710/1005* (2013.01); *B60W 2710/1011* (2013.01); *B60W 2710/1022* (2013.01); *B60Y 2200/92* (2013.01); *F16H 59/72* (2013.01); *F16H 2061/0422* (2013.01); *Y02T 10/6239* (2013.01); *Y02T 10/7258* (2013.01); *Y10S 903/93* (2013.01)

(58) Field of Classification Search
CPC ........... B60W 2710/083; B60W 30/19; B60W 2710/1022; B60W 2710/0666
See application file for complete search history.

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |

| OVERALL SPEED POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 |

CONTROL APPARATUS FOR VEHICULAR DRIVE SYSTEM

This application claims priority from Japanese Patent Application No. 2016-231855 filed on Nov. 29, 2016, the disclosure of which is herein incorporated by reference in its entirety.

FIELD OF THE INVENTION

The present invention relates to a control apparatus for a vehicular drive system provided with a drive power source portion operatively connected to an input shaft of a step-variable transmission portion in a power transmittable manner.

BACKGROUND OF THE INVENTION

There is well known a vehicular drive system provided with a step-variable transmission portion which is shifted to a selected one of a plurality of speed positions having respective speed ratio values, with engaging and releasing actions of a plurality of coupling devices, and a drive power source portion operatively connected to an input shaft of the step-variable transmission portion in a power transmittable manner. JP-2012-46003A discloses an example of this type of vehicular drive system (vehicular power transmitting system). This publication describes an adequate progress of a shift-down action of the step-variable transmission portion in a coasting run of a vehicle (coasting shift-down action), by raising a rotating speed of the input shaft of the step-variable transmission portion from a pre-shift-down synchronizing speed to a post-shift-down synchronizing speed, with an input shaft torque transmitted from the drive power source portion to the input shaft. The publication also describes that a rate of increase of the input shaft torque is reduced with a decrease of a temperature of a working fluid supplied to the coupling devices, and a moment of initiation of a change of the input shaft torque is delayed with the decrease of the temperature.

By the way, each of the coupling devices of the step-variable transmission portion includes friction plates which are rotated relative to each other, and a lubricant is supplied between the adjacent friction plates. The relative rotary motions of the friction plates cause a dragging loss due to the lubricant existing between the adjacent friction plates, even when the coupling device is placed in its released state. This dragging loss (dragging torque) in the step-variable transmission portion due to the lubricant increases with a decrease of the temperature of the lubricant, so that the input shaft speed of the step-variable transmission portion cannot be raised to the post-shift-down synchronizing speed if the value of the torque transmitted to the input shaft of the step-variable transmission portion during the coasting shift-down action when the lubricant temperature is comparatively low is the same as that when the lubricant temperature is normal. In this case, the coasting shift-down action of the step-variable transmission portion does not adequately progress, or takes place in a reverse direction, giving rise to a problem of generation of a shifting shock of the step-variable transmission portion and consequent deterioration of drivability of the vehicle.

SUMMARY OF THE INVENTION

The present invention was made in view of the background art described above. It is therefore an object of the present invention to provide a control apparatus for a vehicular drive system provided with a drive power source portion operatively connected to an input shaft of a step-variable transmission portion in a power transmittable manner, which control apparatus permits an adequate progress of a shift-down action of the step-variable transmission portion in a coasting run of the vehicle, with a reduced degree of shifting shock of the step-variable transmission portion, even when a lubricant in the step-variable transmission portion has a comparatively low temperature.

The object indicated above is achieved according to the following modes of the present invention:

According to a first mode of the invention, there is provided a control apparatus for a vehicular drive system provided with a step-variable transmission portion which is shifted to a selected one of a plurality of speed positions having respective speed ratio values, with engaging and releasing actions of a plurality of coupling devices, and a drive power source portion operatively connected to an input shaft of the step-variable transmission portion in a power transmittable manner, the control apparatus being configured to implement a speed synchronizing control upon a shift-down action of the step-variable transmission portion in a coasting run of a vehicle, wherein a rotating speed of the input shaft of the step-variable transmission portion is raised with an input shaft torque transmitted from the drive power source portion to the input shaft, from a pre-shift-down synchronizing speed to a post-shift-down synchronizing speed, the control apparatus comprising a torque control portion which is operated during the speed synchronizing control implemented upon the shift-down action of the step-variable transmission portion in the coasting run of the vehicle, and which is configured to change the input shaft torque transmitted from the drive power source portion to the input shaft on the basis of a temperature of a lubricant in the step-variable transmission portion such that the input shaft torque is larger when the temperature of the lubricant is comparatively low than when the temperature is comparatively high.

According to a second mode of the invention, the control apparatus according to the first mode of the invention is configured such that the torque control portion increases the input shaft torque to a value larger than a dragging torque generated in the step-variable transmission portion, after initiation of an inertia phase of the shift-down action in a coasting run.

According to a third mode of the invention, the control apparatus according to the first or second mode of the invention is configured such that the torque control portion sets the input shaft torque such that the input shaft torque is smaller when a deceleration value of the vehicle is comparatively high than when the deceleration value is comparatively low.

According to a fourth mode of the invention, the control apparatus according to any one of the first through third modes of the invention is configured such that the drive power source portion of the vehicular drive system controlled by the control apparatus according to any one of the first through third modes of the invention includes an electric motor.

The control apparatus according to the first mode of the present invention is configured such that the input shaft torque of the step-variable transmission portion during coasting shift-down action of the step-variable transmission portion is made larger when the lubricant temperature is comparatively low than when the lubricant temperature is comparatively high, so that the step-variable transmission portion can be given the input shaft torque sufficient to permit an adequate progress of the coasting shift-down action and the shift-down action can be performed similarly to the case when the lubricant temperature is comparatively high, even when the dragging loss (dragging torque) of the step-variable transmission portion is comparatively large when the lubricant temperature is comparatively low. Accordingly, it is possible to reduce the risk that the coasting shift-down action does not adequately progress or takes place in the reverse direction when the lubricant temperature is comparatively low, making it possible to reduce the shifting shock of the step-variable transmission portion due to an increase of the dragging loss of the step-variable transmission portion, and to improve the drivability of the vehicle.

According to the second mode of the invention, the input shaft torque is increased above the dragging torque generated in the step-variable transmission portion after the moment of initiation of the inertia phase of the coasting shift-down action, making it possible to reduce the risk that the coasting shift-down action does not adequately progress or takes place in the reverse direction during the inertia phase.

According to the third mode of the invention, the control apparatus is configured in view of the fact that the risk that the coasting shift-down action does not adequately progress or takes place in the reverse direction is lower when the deceleration value of the vehicle is comparatively high than when the deceleration value is comparatively low. Further, the control apparatus is configured such that the input shaft torque is made smaller when the deceleration value of the vehicle is comparatively high than when the deceleration value is comparatively low, so that the shifting shock of the step-variable transmission portion due to an excessive increase of the input shaft torque can be reduced, and deterioration of the fuel economy of the vehicle due to the excessive increase of the input shaft torque can also be reduced.

According to the fourth mode of the invention, the input shaft torque can be accurately controlled by controlling the electric motor.

DETAILED DESCRIPTION OF PREFERRED EMBODIMENTS

Figure 1:
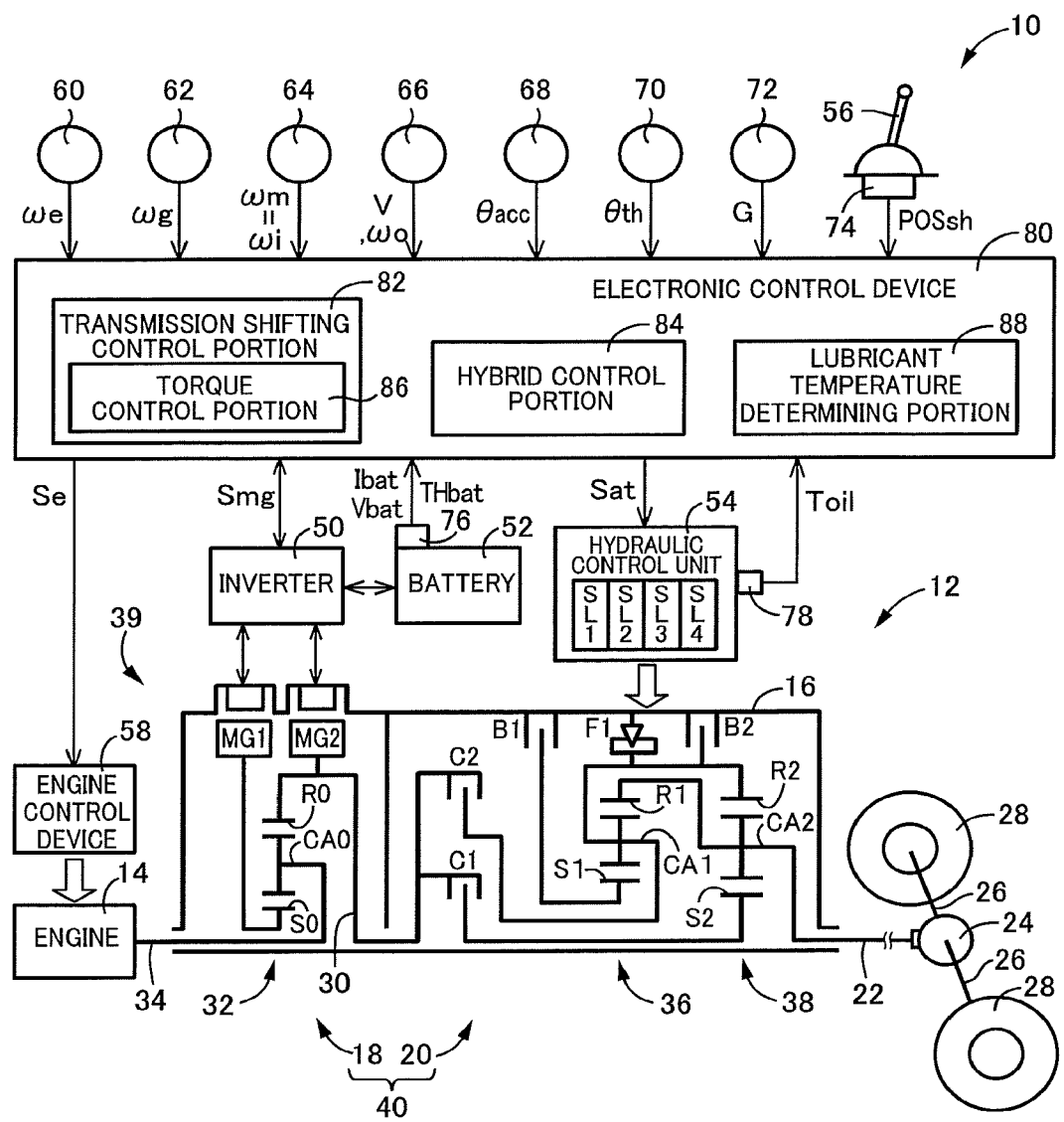
FIG. 1 is a schematic view showing an arrangement of a drive system of a vehicle to be controlled by a control apparatus according to the present invention, and major control functions and control portions of the control apparatus.

Referring to the drawings, preferred embodiments of the present invention will be described in detail. It is to be understood that the drawings are simplified and transformed as needed, and do not necessarily accurately represent the dimensions and shapes of various elements shown therein.

First Embodiment

Reference is first made to FIG. 1, which is the schematic view showing an arrangement of a drive system 12 of a vehicle 10 to be controlled by a control apparatus according to the present invention, and major portions of the control apparatus to perform various controls of the vehicle 10. As shown in FIG. 1, the vehicular drive system 12 is provided with an engine 14 functioning as a drive power source, an electrically controlled continuously variable transmission portion 18 (hereinafter referred to as "continuously variable transmission portion 18") connected directly or indirectly via a damper (not shown) or any other device to the engine 14, and a mechanically operated step-variable transmission portion 20 (hereinafter referred to as "step-variable transmission portion 20) connected to an output rotary member of the continuously variable transmission portion 18. The continuously variable transmission portion 18 and the step-variable transmission portion 20 are disposed in series with each other within a transmission casing 16 (hereinafter referred to as "casing 16") functioning as a stationary member fixed to a body of the vehicle 10, such that the transmission portions 18 and 20 are disposed coaxially with each other on a common axis. The vehicular drive system 12 is further provided with a differential gear mechanism 24 connected to an output rotary member of the step-variable transmission portion 20 in the form of an output shaft 22, and a pair of axles 26 connected to the differential gear mechanism 24. In the vehicular drive system 12, a drive force ("drive torque" or "drive power" unless otherwise distinguished from the drive force) of the engine 14 and a second electric motor MG2 (described below) is transmitted to the step-variable transmission portion 20, and is transmitted from the step-variable transmission portion 20 to drive wheels 28 of the vehicle 10 through the differential gear mechanism 24 and other devices. The vehicular drive system 12 is suitably used in the vehicle 10 of an FR type (front-engine rear-drive type) in which the axis of the engine 14 is parallel to the longitudinal direction of the vehicle 10. It is noted that the continuously variable transmission portion 18 and the step-variable transmission portion 20 are constructed substantially symmetrically with each other about the axis of the engine 14 (about the above-indicated common axis), and that FIG. 1 does not show the lower halves of the transmission portions 18 and 20.

The engine 14 is the drive power source to drive the vehicle 10, which is a known internal combustion engine such as a gasoline engine or a diesel engine. An engine torque Te which is an output torque of this engine 14 is controlled by an electronic control device 80 (described below) which controls the operating condition of the engine 14 as represented by an opening angle of a throttle valve or an intake air quantity, an amount of injection of a fuel and an ignition timing. In the present embodiment, the engine 14 is connected to the continuously variable transmission portion 18, without a fluid-operated type power transmitting device such as a torque converter or a fluid coupling being disposed between the engine 14 and the transmission portion 18.

The continuously variable transmission portion 18 is provided with: a first electric motor MG1; a differential mechanism 32 functioning as a power distributing device to mechanically distribute the drive force of the engine 14 to the first electric motor MG1, and to an intermediate power transmitting member 30 which is an output rotary member of the continuously variable transmission portion 18; and the second electric motor MG2 operatively connected to the intermediate power transmitting member 30. The continuously variable transmission portion 18 is an electrically controlled continuously variable transmission wherein a differential state of the differential mechanism 32 is controllable by controlling an operating state of the first electric motor MG1. The first electric motor MG1 functions as a differential motor/generator (a differential motor) while the second electric motor MG2 is an electric motor which functions as a drive power source, namely, a vehicle driving motor/generator. The vehicle 10 is a hybrid vehicle provided with the drive power source in the form of the engine 14 and the second electric motor MG2. In the present embodiment, the engine 14 and continuously variable transmission portion 18 constitute a drive power source portion 39 which is operatively connected to the intermediate power transmitting member 30 functioning as input shaft of the step-variable transmission portion 20 in a power transmittable manner, and which can adjust an input shaft torque Ti of the step-variable transmission portion 20. Thus, the drive power source portion 39 includes the engine 14 and the second electric motor MG2. The second electric motor MG2 corresponds to an electric motor of the drive power source portion 39 of the vehicular drive system 12 to be controlled by the control apparatus according to the present invention.

Each of the first electric motor MG1 and the second electric motor MG2 is an electrically operated rotary device having a function of an electric motor and a function of an electric generator. The first electric motor MG1 and the second electric motor MG2 are connected to an electric power storage device in the form of a battery 52 through an inverter 50. The inverter 50 provided on the vehicle 10 is controlled by the control apparatus in the form of the above-indicated electronic control device 80 described below in detail, to control an output torque (forward driving torque or regenerative torque) of each of the first and second electric motors MG1 and MG2, namely, an MG1 torque Tg and an MG2 torque Tm. The battery 52 also provided on the vehicle 10 is the electric power storage device to and from which an electric power is supplied from and to the first electric motor MG1 and the second electric motor MG2.

The differential mechanism 32 is a planetary gear set of a single-pinion type having a sun gear S0, a carrier CA0 and a ring gear R0. The carrier CA0 is operatively connected to the engine 14 through a connecting shaft 34 in a power transmittable manner, and the sun gear S0 is operatively connected to the first electric motor MG1 in a power transmittable manner, while the ring gear R0 is operatively connected to the second electric motor MG2 in a power transmittable manner. In the differential mechanism 32, the carrier CA0 functions as an input rotary element, and the sun gear S0 functions as a reaction rotary element, while the ring gear R0 functions as an output rotary element.

The step-variable transmission portion 20 is a step-variable transmission which constitutes a part of a power transmitting path between the intermediate power transmitting member 30 and the drive wheels 28. The intermediate power transmitting member 30 also functions as the input shaft of the step-variable transmission portion 20. The step-variable transmission portion 20 is considered to also constitute a part of a power transmitting path between the second electric motor MG2 and the drive wheels 28, since the second electric motor MG2 is connected to the intermediate power transmitting member 30 such that the intermediate power transmitting member 30 is rotated together with the second electric motor MG2. The step-variable transmission portion 20 is a known automatic transmission of a planetary gear type which is provided with a plurality of planetary gear sets in the form of a first planetary gear set 36 and a second planetary gear set 38, and a plurality of coupling devices in the form of a clutch C1, a clutch C2, a brake B1 and a brake B2 (hereinafter referred to as "coupling devices CB" unless otherwise specified), and which is shifted to a selected one of a plurality of speed positions having respective speed ratio values, with engaging and releasing actions of the coupling devices CB.

Each of the coupling devices CB is a hydraulically operated frictional coupling device in the form of clutch or brake having friction plates or a friction plate that are/is operatively pressed by a hydraulic actuator, or a band brake that is operatively tightened by a hydraulic actuator. The coupling devices CB are selectively placed in engaged, slipped or released states with their torque capacities (engaging torque values) Tcb being changed according to engaging hydraulic pressures Pcb applied thereto, which are regulated by respective solenoid-operated valves SL1-SL4 incorporated within a hydraulic control unit 54. In order for each coupling device CB to be able to transmit a torque (for example, an AT input shaft torque Ti which is an input shaft torque of the step-variable transmission portion 20) between the intermediate power transmitting member 30 and the output shaft 22, without a slipping action (without a speed difference between input and output elements of the coupling device CB), the relevant coupling device CB should be given an engaging torque Tcb enough to permit transmission of a component of the input shaft torque, which is assigned to be transmitted by the coupling device CB in question, that is, to permit transmission of an assigned torque to be transmitted through an engaging action of the coupling device CB. However, it is noted that an increase of the engaging torque Tcb enough to obtain the assigned torque does not cause an increase of the assigned torque. That is, the engaging torque Tcb is equivalent to a maximum value of the torque that can be transmitted through the coupling device CB, and the assigned torque is equivalent to the torque that is actually transmitted through the coupling device CB. It is noted that the engaging torque (assigned torque) Tcb and the engaging hydraulic pressure Pcb are proportional to each other, before the engaging hydraulic pressure Pcb has been raised to initiate an engaging contact of the input and output elements with each other.

In the step-variable transmission portion 20, selected ones of rotary elements (sun gears S1 and S2, carriers CA1 and CA2, and ring gears R1 and R2) of the first and second planetary gear sets 36 and 38 are connected to each other or to the intermediate power transmitting member 30, casing 16 or output shaft 22, either directly or indirectly (selectively) through the coupling devices CB or a one-way clutch F1.

The step-variable transmission portion 20 is shifted to a selected one of four AT gear positions (speed positions) by engaging actions of selected ones of the coupling devices CB. These four AT gear positions have respective different speed ratios γat (=AT input shaft speed ωi/AT output shaft speed ωo). The AT input shaft speed ωi is a rotating speed (angular velocity) of the input rotary member of the step-variable transmission portion 20, that is, a rotating speed of the intermediate power transmitting member 30, which is equal to an MG2 speed ωm which is an operating speed of the second electric motor MG2. Namely, the AT input shaft speed ωi can be represented by the MG2 speed ωm. The AT output shaft speed ωo is a rotating speed of the output shaft 22 of the step-variable transmission portion 20, which is considered to be an output shaft speed of a transmission device 40 which consists of the continuously variable transmission portion 18 and the step-variable transmission portion 20.

Figures 2, 3:
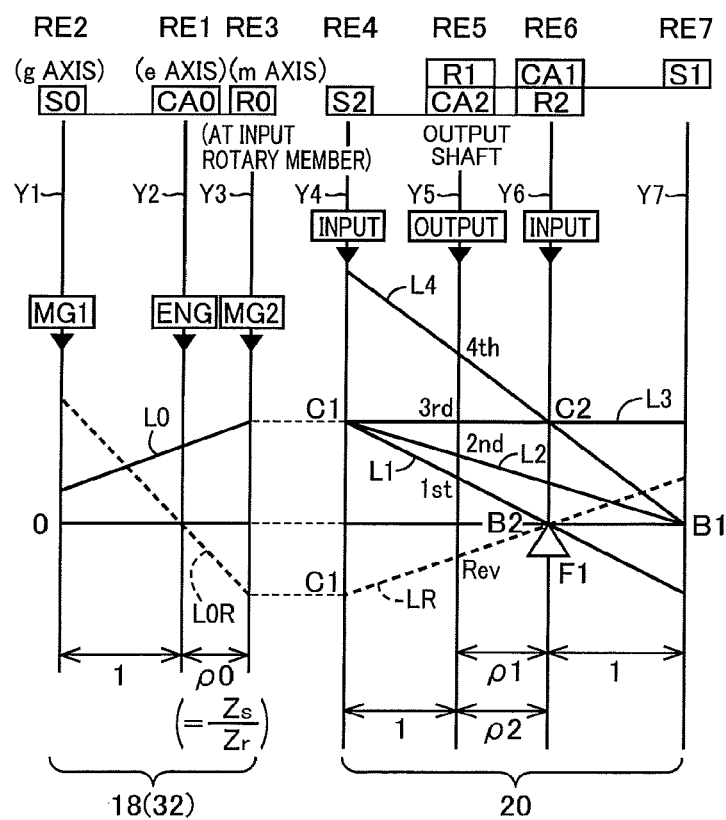
FIG. 2 is a table indicating a relationship between gear positions of a mechanically operated step-variable transmission portion shown in FIG. 1 and combinations of coupling devices placed in engaged states to establish the respective gear positions.
FIG. 3 is a collinear chart indicating a relationship among rotating speeds of rotary elements of an electrically controlled continuously variable transmission portion also shown in FIG. 1 and the mechanically operated step-variable transmission portion.

Reference is now made to FIG. 2, which is the table indicating the relationship between the first through fourth speed AT gear positions of the step-variable transmission portion 20 shown in FIG. 1 and combinations of the coupling devices CB placed in the engaged states to establish the respective AT gear positions. In the table, the four forward drive AT gear positions are respectively represented by "$1^{st}$", "$2^{nd}$", "$3^{rd}$" and "$4^{th}$". The first speed AT gear position "$1^{st}$" has a highest speed ratio γat, and the speed ratios γat of the four AT gear positions decrease in the direction from the first speed AT gear position (lowest-speed gear position) "$1^{st}$" toward the fourth speed AT gear position (highest-speed gear position) "$4^{th}$". In the table, "O" indicates the engaged state of the coupling devices CB, "Δ" indicates the engaged state of the coupling device B2 during application of an engine brake to the vehicle 10 or during a shift-down action of the step-variable transmission portion 20 while the vehicle 10 is in a coasting run (coasting shift-down action), while the blank indicates the released state of the coupling devices CB. The one-way clutch F1 indicated above is disposed in parallel to the brake B2 which is placed in the engaged state to establish the first speed AT gear position "$1^{st}$", so that the brake B2 is not required to be placed in the engaged state upon starting or acceleration of the vehicle 10. The above-indicated shift-down action of the step-variable transmission portion 20 in the coasting run of the vehicle 10 is a kind of "power-off shift-down action" which is required as a result of reduction of a vehicle-speed-related value (vehicle running speed V, for example) due to reduction of a required drive force (as represented by an operation amount θacc of an accelerator pedal) or during deceleration of the vehicle 10 in a released position of the accelerator pedal (with the operation amount θacc of the accelerator pedal being zero or substantially zero), and is a shift-down action which is required during deceleration of the vehicle 10 in the released position of the accelerator pedal. It is noted that the step-variable transmission portion 20 is placed in a neutral position (a power transmission cutoff state) when all of the coupling devices CB are placed in the released states.

The step-variable transmission portion 20 is shifted up or down to establish a newly selected one of the four AT gear positions, according to the operation amount θacc of the accelerator pedal and the vehicle running speed V, with a releasing action of one of the coupling devices CB and a concurrent engaging action of another coupling device CB, which concurrent releasing and engaging actions are controlled by the above-indicated electronic control device 80. The above-indicated one coupling device CB is a releasing-side coupling device to be placed in its released state to establish the newly selected AT gear position, while the above-indicated another coupling device CB is an engaging-side coupling device to be placed in its engaged state to establish the newly selected AT gear position. Thus, the step-variable transmission portion 20 is shifted up or down from one of the AT gear positions to another by so-called "clutch-to-clutch" shifting operation, namely, concurrent releasing and engaging actions of the selected two coupling devices CB. For instance, the step-variable transmission portion 20 is shifted down from the second speed AT gear position "$2^{nd}$" to the first speed AT gear position "$1^{st}$", with the releasing action of the brake B1 and the concurrent engaging action of the brake B2, as indicated in the table of FIG. 2. In this respect, it is noted that the first speed AT gear position "$1^{st}$" is established in the engaged states of the clutch C1 and the brake B2, while the brake B2 is placed in the released state in the second speed AT gear position "$2^{nd}$", so that the brake B2 is brought into the engaged state to shift down the step-variable transmission portion 20 from the second speed AT gear position "$2^{nd}$" to the first speed AT gear position "$1^{st}$". In this instance, the hydraulic pressures applied to the brakes B1 and B2 are transiently controlled according to predetermined patterns to bring these brakes B1 and B2 into the released and engaged states, respectively.

The collinear chart of FIG. 3 indicates a relationship among rotating speeds of the rotary elements of the continuously variable transmission portion 18 and the step-variable transmission portion 20. In this collinear chart, three vertical lines Y1, Y2 and Y3 corresponding to the respective three rotary elements of the differential mechanism 32 of the continuously variable transmission portion 18 respectively represent a "g" axis representing the rotating speed of the second rotary element RE2 in the form of the sun gear S0, an "e" axis representing the rotating speed of the first rotary element RE1 in the form of the carrier CA0, and an "m" axis representing the rotating speed of the third rotary element RE3 in the form of the ring gear R0 (i.e., the input shaft speed of the step-variable transmission portion 20). Further, four vertical lines Y4, Y5, Y6 and Y7 corresponding to the respective four rotary elements of the step-variable transmission portion 20 respectively represent an axis representing the rotating speed of the fourth rotary element RE4 in the form of the sun gear S2, an axis representing the rotating speed of the fifth rotary element RE5 in the form of the ring gear R1 and the carrier CA2 fixed to each other, namely, the rotating speed of the output shaft 22, an axis representing the rotating speed of the sixth rotary element RE6 in the form of the carrier CA1 and the ring gear R2 fixed to each other, and an axis representing the rotating speed of the seventh rotary element RE7 in the form of the sun gear S1. The distances between the adjacent ones of the vertical lines Y1, Y2 and Y3 are determined by a gear ratio $\rho 0$ of the differential mechanism 32, while the distances between the adjacent ones of the vertical lines Y4-Y7 are determined by gear ratios $\rho 1$ and $\rho 2$ of the respective first and second planetary gear sets 36 and 38. Where the distance between the axis representing the rotating speed of the sun gear S0, S1, S2 and the axis representing the rotating speed of the carrier CA0, CA1, CA2 corresponds to "1", the distance between the axis representing the rotating speed of the carrier CA0, CA1, CA2 and the axis representing the rotating speed of the ring gear R0, R1, R2 corresponds to the gear ratio $\rho$ of the planetary gear set (=number of teeth Zs of the sun gear/number of teeth Zr of the ring gear).

Referring to the collinear chart of FIG. 3, the differential mechanism 32 of the continuously variable transmission portion 18 is arranged such that the engine 14 (represented as "ENG" in the collinear chart) is connected to the first rotary element RE1, and the first electric motor MG1 (represented as "MG1" in the collinear chart) is connected to the second rotary element RE2, while the second electric motor MG2 (represented as "MG2" in the collinear chart) is connected to the third rotary element RE3 which is rotated together with the intermediate power transmitting member 30. Thus, a rotary motion of the engine 14 is transmitted to the step-variable transmission portion 20 through the intermediate power transmitting member 30. In a part of the collinear chart corresponding to the continuously variable transmission portion 18, straight lines L0 and L0R intersecting the vertical line Y2 represent a relationship between the rotating speeds of the sun gear S0 and the ring gear R0.

The step-variable transmission portion 20 is arranged such that the fourth rotary element RE4 is selectively connected to the intermediate power transmitting member 30 through the clutch C1, the fifth rotary element RE5 is connected to the output shaft 22, the sixth rotary element RE6 is selectively connected to the intermediate power transmitting member 30 through the clutch C2 and is selectively connected to the casing 16 through the brake B2, and the seventh rotary element RE7 is selectively connected to the casing 16 through the brake B1. In a part of the collinear chart corresponding to the step-variable transmission portion 20, straight lines L1, L2, L3, L4 and LR intersecting the vertical line Y5 represent the rotating speeds of the output shaft 22 in the respective first, second, third, fourth speed and reverse drive AT gear positions "$1^{st}$", "$2^{nd}$", "$3^{rd}$", "$4^{th}$" and "Rev" that are selectively established with selective engaging and releasing actions of the coupling devices CB.

Solid straight lines L0, L1, L2, L3 and L4 shown in the collinear chart of FIG. 3 indicate the relative rotating speeds of the rotary elements in a hybrid drive mode in which the vehicle 10 is driven in the forward direction with at least the engine 14 being operated as a drive power source. In the differential mechanism 32 and in the hybrid drive mode, when a torque Te of the engine 14 (engine torque Te) is applied to the carrier CA0 while a reaction torque which is a negative torque generated by the first electric motor MG1 operated in the positive direction is applied to the sun gear S0, a directly transmitted engine torque Td ($=Te/(1+\rho)=-(1/\rho)*Tg$) which is a positive torque is applied to the ring gear R0, whereby the ring gear R0 is rotated in the positive direction with the engine torque Td: The vehicle 10 is driven in the forward direction with a vehicle drive torque which is a sum of the directly transmitted engine torque Td and the MG2 torque Tm and which is transmitted to the drive wheels 28 through the step-variable transmission portion 20 selectively placed in one of the first through fourth speed AT gear positions according to a required vehicle drive force. At this time, the first electric motor MG1 functions as an electric generator operated in the positive direction, and generates a negative torque. An electric power Wg generated by the first electric motor MG1 is stored in the battery 52 or consumed by the second electric motor MG2. The second electric motor MG2 is operated to generate the MG2 torque Tm, with all or a part of the electric power Wg generated by the first electric motor MG1, or a sum of the generated electric power Wg and the electric power supplied from the battery 52.

In the differential mechanism 32 and in a motor drive mode in which the vehicle 10 is driven with a drive force generated by the second electric motor MG2 operated as a drive power source while the engine 14 is held at rest, the carrier CA0 is held stationary while the MG2 torque Tm which is a positive torque is applied to the ring gear R0, whereby the ring gear R0 is rotated in the positive direction with the MG2 torque Tm. In this motor drive mode, the state of the differential mechanism 32 is not shown in the collinear chart of FIG. 3. At this time, the first electric motor MG1 connected to the sun gear S0 is placed in a non-load state and freely operated in the negative direction. Namely, in the motor drive mode, the engine 14 is held in non-operated state, so that an operating speed we of the engine 14 (engine speed $\omega e$) is kept zero, and the vehicle 10 is driven in the forward direction with the MG2 torque Tm (positive forward driving torque), which is transmitted as a forward drive torque to the drive wheels 28 through the step-variable transmission portion 20 placed in one of the first through fourth speed AT gear positions.

Broken straight lines L0R and LR indicated in FIG. 3 indicate relative rotating speeds of the rotary elements during a reverse running of the vehicle 10 in the motor drive mode. When the vehicle 10 is driven in the rearward direction in this motor drive mode, the MG2 torque Tm which is a negative torque is applied to the ring gear R0, and rotates the ring gear R0 in the negative direction, and is transmitted as a rear drive torque of the vehicle 10 to the drive wheels 28 through the step-variable transmission portion 20 placed in the first speed AT gear position. As described below, the electronic control device 80 controls the second motor/generator MG2 to permit the vehicle 10 to be driven in the rearward direction with the MG2 torque Tm generated while the step-variable transmission portion 20 is placed in the forward-drive low-speed gear position in the form of the first speed AT gear position which is one of the first through fourth speed AT gear positions. The above-indicated MG2 torque Tm is a reverse drive torque Tm of the second electric motor MG2 (a negative torque generated with an operation of the second electric motor MG2 in the negative direction, which is specifically referred to as "MG2 torque TmR") which is opposite in the direction of its transmission to a forward drive torque Tm of the second electric motor MG2 (a positive torque generated with an operation of the second motor/generator MG2 in the positive direction, which is specifically referred to as "MG2 torque TmF"). Thus, the vehicle 10 to be controlled by the electronic control device 80 is driven in the rearward direction by operating the second electric motor MG2 in the negative direction to generate the negative torque Tm while the step-variable transmission portion 20 is placed in the forward drive AT gear position (which is also used to drive the vehicle 10 in the forward direction). Namely, the step-variable transmission portion 20 may not comprise a reverse drive AT gear position in which the direction of the output rotary member is reversed with respect to the direction of the input rotary member, and which is used only for driving in rearward direction. It is noted that the vehicle 10 can be driven in the rearward direction in the hybrid drive-mode as well as in the motor drive mode, since the second motor/generator MG2 can be operated in the negative direction, as indicated by the straight line L0R.

In the vehicular drive system 12, the continuously variable transmission portion 18 functions as an electrically controlled shifting mechanism (electrically controlled differential mechanism) provided with the differential mechanism 32 the differential state of which is controlled by controlling the operating state of the first electric motor MG1 provided as the differential electric motor, and which has the three rotary elements, that is, the first rotary element RE1 in the form of the carrier CA0 to which the engine 14 is operatively connected in a power transmittable manner, the second rotary element RE2 in the form of the sun gear S0 to which the first electric motor MG1 is operatively connected in a power transmittable manner, and the third rotary element RE3 in the form of the ring gear R0 to which the intermediate power transmitting member 30 is connected (in other words, to which the second electric motor MG2 provided as the vehicle driving electric motor is operatively connected) in a power transmittable manner. Namely, the continuously variable transmission portion 18 has the differential mechanism 32 to which the engine 14 is operatively connected in a power transmittable manner, and the first electric motor MG1 to which the differential mechanism 32 is operatively connected in a power transmittable manner, and the operating state of which is controlled to control the differential state of the differential mechanism 32. The continuously variable transmission portion 18 is operated as an electrically controlled continuously variable transmission a speed ratio $\gamma 0$ ($=\omega e/\omega m$) of which is variable. The speed ratio is a ratio of rotating speed of the connecting shaft 34 (namely, engine speed $\omega e$) to the rotating speed of the intermediate power transmitting member 30 (namely, MG2 speed corn).

In the hybrid drive mode, for instance, the rotating speed of the sun gear S0 is raised or lowered by controlling operating speed of the first electric motor MG1 while the rotating speed of the ring gear R0 is determined by rotating speed of the drive wheels 28 with the step-variable transmission portion 20 placed in one of the AT gear positions, so that the rotating speed of the carrier CA0 (namely, engine speed $\omega e$) is accordingly raised or lowered. For running of the vehicle 10 with an operation of the engine 14, therefore, the engine 14 can be operated at an efficient operating point. That is, the step-variable transmission portion 20 to be placed in a selected one of the AT gear positions and the continuously variable transmission portion 18 functioning as a continuously variable transmission cooperate to provide the transmission device 40 which functions as a continuously variable transmission as a whole.

Alternatively, the continuously variable transmission portion 18 can be shifted like a step-variable transmission. Accordingly, the transmission device 40 constituted by the step-variable transmission portion 20 to be placed in one of the AT gear positions and the continuously variable transmission portion 18 which can be shifted like the step-variable transmission can be shifted like a step-variable transmission as a whole. That is, the step-variable transmission portion 20 and the continuously variable transmission portion 18 can be controlled to selectively establish a plurality of speed positions (hereinafter referred to as "overall speed positions" or "conceptual speed positions") having respective different values of a speed ratio $\gamma t$ ($=\omega e/\omega o$) which is a ratio of the engine speed $\omega e$ to the output shaft speed $\omega o$. The speed ratio $\gamma t$ is an overall speed ratio of the transmission device 40 consisting of the continuously variable transmission portion 18 and the step-variable transmission portion 20 which are disposed in series with each other. The overall speed ratio $\gamma t$ is equal to a product of the speed ratio $\gamma 0$ of the continuously variable transmission portion 18 and the speed ratio $\gamma at$ of the step-variable transmission portion 20, namely, $\gamma t = \gamma 0 \ast \gamma at$.

Figures 4, 5:
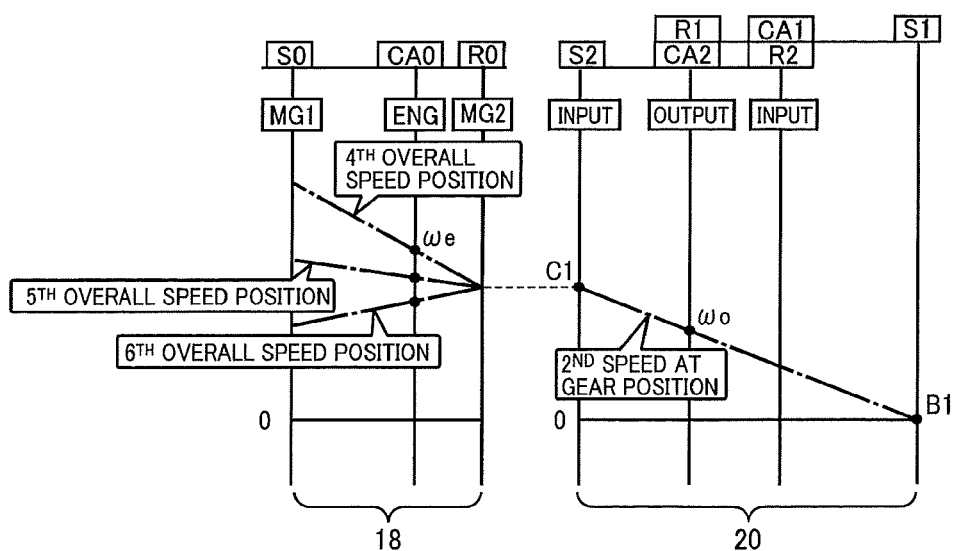
FIG. 4 is a table indicating an example of a plurality of overall speed positions of a transmission device in relation to the gear positions of the step-variable transmission portion.
FIG. 5 is an example of the collinear chart indicating the fourth through sixth overall speed positions of the transmission device in which the second speed gear position of the step-variable transmission portion is established.

At least one overall speed position is provided for each of the four AT gear positions of the step-variable transmission portion 20, with a combination of each AT gear position with at least one of the different speed ratio values $\gamma 0$ of the continuously variable transmission portion 18. FIG. 4 is the table indicating an example of the overall speed positions of the transmission device 40, wherein first through third overall speed positions are established for the first speed AT gear position, fourth through sixth overall speed positions are established for the second speed AT gear position, seventh through ninth overall speed positions are established for the third speed AT gear position, and a tenth overall speed position is established for the fourth speed AT gear position. FIG. 5 is the view indicating a case of the fourth through sixth overall speed positions of the transmission device 40 in which the second speed AT gear position of the step-variable transmission portion 20 is achieved, on a collinear chart similar to that of FIG. 3. In the transmission device 40, the continuously variable transmission portion 18 is controlled to control the engine speed $\omega e$ with respect to the output shaft speed $\omega o$ for establishing the predetermined overall speed ratio values $\gamma t$, to thereby establish each of the overall speed positions.

Referring back to FIG. 1, the vehicle 10 is provided with the control apparatus in the form of the electronic control device 80 configured to control various devices of the vehicle 10 such as the engine 14, continuously variable transmission portion 18 and step-variable transmission portion 20. FIG. 1 is the view showing input and output signals of the electronic control device 80, and is a functional block diagram showing major control functions and control portions of the electronic control device 80. For example, the electronic control device 80 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control device 80 may be constituted by two or more control units exclusively assigned to perform different control operations such as engine control operations and transmission shifting control operations.

The electronic control device 80 receives various input signals such as: an output signal of an engine speed sensor 60 indicative of the engine speed $\omega e$; an output signal of an MG1 speed sensor 62 indicative of the MG1 speed ωg which is the operating speed of the first electric motor MG1; an output signal of an MG2 speed sensor 64 indicative of the MG2 speed ωm which is the AT input shaft speed ωi; an output signal of an output shaft speed sensor 66 indicative of the output shaft speed ωo corresponding to the vehicle running speed V; an output signal of an accelerator pedal operation amount sensor 68 indicative of the operation amount θacc of the accelerator pedal, which operation amount θacc represents a degree of acceleration of the vehicle 10 required by a vehicle operator; an output signal of a throttle valve opening angle sensor 70 indicative of an angle θth of opening of an electronic throttle valve; an output signal of an acceleration sensor 72 indicative of a longitudinal acceleration value G of the vehicle 10; an output signal of a shift position sensor 74 indicative of a presently selected operating position POSsh of a manually operated shifting member in the form of a shift lever 56 provided in the vehicle 10; output signals of a battery sensor 76 indicative of a temperature THbat, a charging/discharging electric current Ibat and a voltage Vbat of the battery 52; and an output signal of a lubricant temperature sensor 78 indicative of a temperature Toil of a lubricant for lubricating the coupling devices CB. It is noted that a portion of a working fluid discharged from a regulator valve incorporated in the hydraulic control unit 54 to regulate line pressure of the working fluid to operate the hydraulic actuators of the coupling device CB is supplied as the lubricant to the coupling devices CB. The lubricant temperature sensor 78 is disposed in an oil passage through which the lubricant is supplied to the coupling devices CB.

Further, the electronic control device 80 generates various output signals such as: an engine control command signal Se to be applied to an engine control device 58 provided to control a throttle actuator, a fuel injecting device and an ignition device, for controlling the engine 14; electric motor control command signals Smg to be applied to the inverter 50, for controlling the first electric motor MG1 and the second electric motor MG2; and hydraulic control command signals Sat to be applied to the hydraulic control unit 54, for controlling the operating states of the coupling devices CB (namely, for controlling the shifting actions of the step-variable transmission portion 20). The hydraulic control command signals Sat are command signals (drive signals) to be applied to the hydraulic control unit 54 for controlling amounts of electric currents to be applied to the solenoid-operated valves SL1-SL4 which regulate the engaging hydraulic pressure Pcb to be applied to each of the hydraulic actuators of the coupling devices CB. The electronic control device 80 operates to set a hydraulic pressure command value (command pressure) corresponding to the engaging hydraulic pressure Pcb to be applied to each of the hydraulic actuators, and outputs a drive current corresponding to the hydraulic pressure command value.

The presently selected operating position POSsh of the shift lever 56 is one of: a parking position P; a reverse drive position R; a neutral position N; and a forward drive position D, for example. The parking position P is a position which is established while the transmission device 40 is placed in a neutral state (in which the step-variable transmission portion 20 is placed in a non-power transmittable state with all of the coupling devices CB placed in their released state) and in which the output shaft 22 is mechanically locked to prevent its rotary motion, for thereby holding the transmission device 40 in a parking brake position. The reverse drive position R is a position in which the transmission device 40 is placed in a rear drive state in which the vehicle 10 can be driven in the rearward direction with the MG2 torque TmR while the step-variable transmission portion 20 is placed in the first speed AT gear position. The neutral position N is a position in which the transmission device 40 is placed in the above-indicated neutral state. The forward drive position D is a position in which the transmission device 40 is placed in a forward drive state in which the vehicle 10 can be driven in the forward direction according to an automatic shifting control to selectively establish one of all of the first through fourth speed AT gear positions (one of all of the first through tenth overall speed positions). Therefore, when the shift lever 56 is switched from the forward drive position D to the rear drive position R, the transmission device 40 is commanded to be switched from its forward drive state to the rear drive state (namely, to perform a switching action from the forward drive state to the rear drive state). Thus, the manually operated shift lever 56 functions as a manually operated member for commanding the transmission device 40 in a selected one of its operating states describe above.

The electronic control device 80 is configured to calculate a charging state (stored electric power amount) SOC of the battery 52 on the basis of the charging/discharging electric current Ibat and the voltage Vbat of the battery 52. The electronic control device 80 is further configured to calculate, on the basis of, for example, the temperature THbat and the charging state SOC of the battery 52, a maximum charging amount Win of electric power that can be stored in the battery 52, and a maximum discharging amount Wout of electric power that can be discharged from the battery 52, which maximum charging and discharging amounts Win and Wout define a range of an electric power of the battery 52 that can be used. The calculated maximum charging and discharging amounts Win and Wout decrease with a decrease of the battery temperature THbat when the battery temperature THbat is lower than a normal level, and decrease with an increase of the battery temperature THbat when the battery temperature THbat is higher than the normal level. Further, the maximum charging amount Win decreases with an increase of the stored electric power amount SOC when the stored electric power amount SOC is relatively large. The maximum discharging amount Wout decreases with a decrease of the stored electric power amount SOC when the stored electric power amount SOC is relatively small.

To implement various controls of the vehicle 10, the electronic control device 80 includes transmission shifting control means in the form of a transmission shifting control portion 82, hybrid control means in the form of a hybrid control portion 84, torque control means in the form of a torque control portion 86, and lubricant temperature determining means in the form of a lubricant temperature determining portion 88.

The transmission shifting control portion 82 is configured to determine a shifting action of the step-variable transmission portion 20 according to a memory-stored AT gear position shifting map obtained by experimentation or determined by an appropriate design theory, and applies the hydraulic control command signals Sat to the hydraulic control unit 54, for commanding the solenoid-operated valves SL1-SL4 to bring the appropriate ones of the coupling devices CB into the released and engaged states, for automatically shifting up or down the step-variable transmission portion 20. The AT gear position shifting map indicated above is a predetermined relationship between two variables in the form of the output shaft speed ωo (equivalent to the vehicle running speed V) and the accelerator pedal operation amount θacc (equivalent to a required drive torque Tdem and the throttle valve opening angle θth), which relationship is used to determine a shifting action of the step-variable transmission portion 20 and is represented by shift-up and shift-down shifting lines in a two-dimensional coordinate system in which the output shaft speed ωo and the accelerator pedal operation amount θacc are taken along respective two axes.

The hybrid control portion 84 has a function of an engine control means or portion to control the engine 14, and a function of an electric motor control means or portion to control the first electric motor MG1 and the second electric motor MG2 through the inverter 50. Thus, the hybrid control portion 84 performs hybrid drive controls for controlling the engine 14, first electric motor MG1 and second electric motor MG2. The hybrid control portion 84 is configured to calculate a required vehicle drive power Pdem on the basis of the accelerator pedal operation amount θacc and the vehicle running speed V, and according to a predetermined relationship in the form of a drive force map, for instance. In other words, the hybrid control portion 84 calculates the required drive torque Tdem at the present vehicle running speed V. The hybrid control portion 84 generates the engine control command signal Se to control the engine 14, and the electric motor control command signals Smg to control the first electric motor MG1 and the second electric motor MG2, for establishing the required vehicle drive power Pdem, while taking account of the maximum charging and discharging amounts Win and Wout of electric power of the battery 52. For example, the engine control command signal Se represents a command value of a power Pe of the engine 14 generating the torque Te at its present operating speed ωe. For example, the electric motor control command signals Smg represent a command value of an electric power amount Wg to be generated by the first electric motor MG1 to generate the reaction torque counteracting the engine torque Te, namely, the MG1 torque Tg at the present MG1 speed ωg, and an electric power amount Wm to be consumed by the second electric motor MG2 to generate the MG2 torque Tm at the present MG2 speed ωm.

When the transmission device 40 as a whole is operated as the continuously variable transmission while the continuously variable transmission portion 18 is operated as the continuously variable transmission, for instance, the hybrid control portion 84 controls the engine 14 and the electric power amount Wg to be generated by the first electric motor MG1, so as to establish the engine speed ωe and the engine torque Te for obtaining the engine power Pe to establish the required vehicle drive power Pdem, while taking account of a highest fuel economy point of the engine 14, so that the speed ratio γ0 of the continuously variable transmission portion 18 is controlled so as to be continuously varied. As a result, the speed ratio γt of the transmission device 40 is controlled while the continuously variable transmission portion 18 is operated as the continuously variable transmission.

When the transmission device 40 as a whole is operated as the step-variable transmission while the continuously variable transmission portion 18 is operated as the step-variable transmission, for instance, the hybrid control portion 84 determines a shifting action of the transmission device 40 according to an overall speed position shifting map, for example, and performs a shifting control of the continuously variable transmission portion 18 to establish a selected one of the plurality of overall speed positions, in cooperation with the transmission shifting control portion 82 to shift the step-variable transmission portion 20 selectively to the AT gear positions. The plurality of overall speed positions can be established by controlling the first electric motor MG1 to control the engine speed ωe according to the output shaft speed ωo so as to maintain the respective speed ratio values γt. It is noted that the speed ratio γt of each of the overall speed positions does not necessarily have to be held constant over an entire range of the output shaft speed ωo, but may be changed in a certain part or parts of the entire range of the output shaft speed ωo or may be given a limitation or limitations, for example, depending on upper and lower limits of rotating speeds of respective rotary elements.

Figure 6:
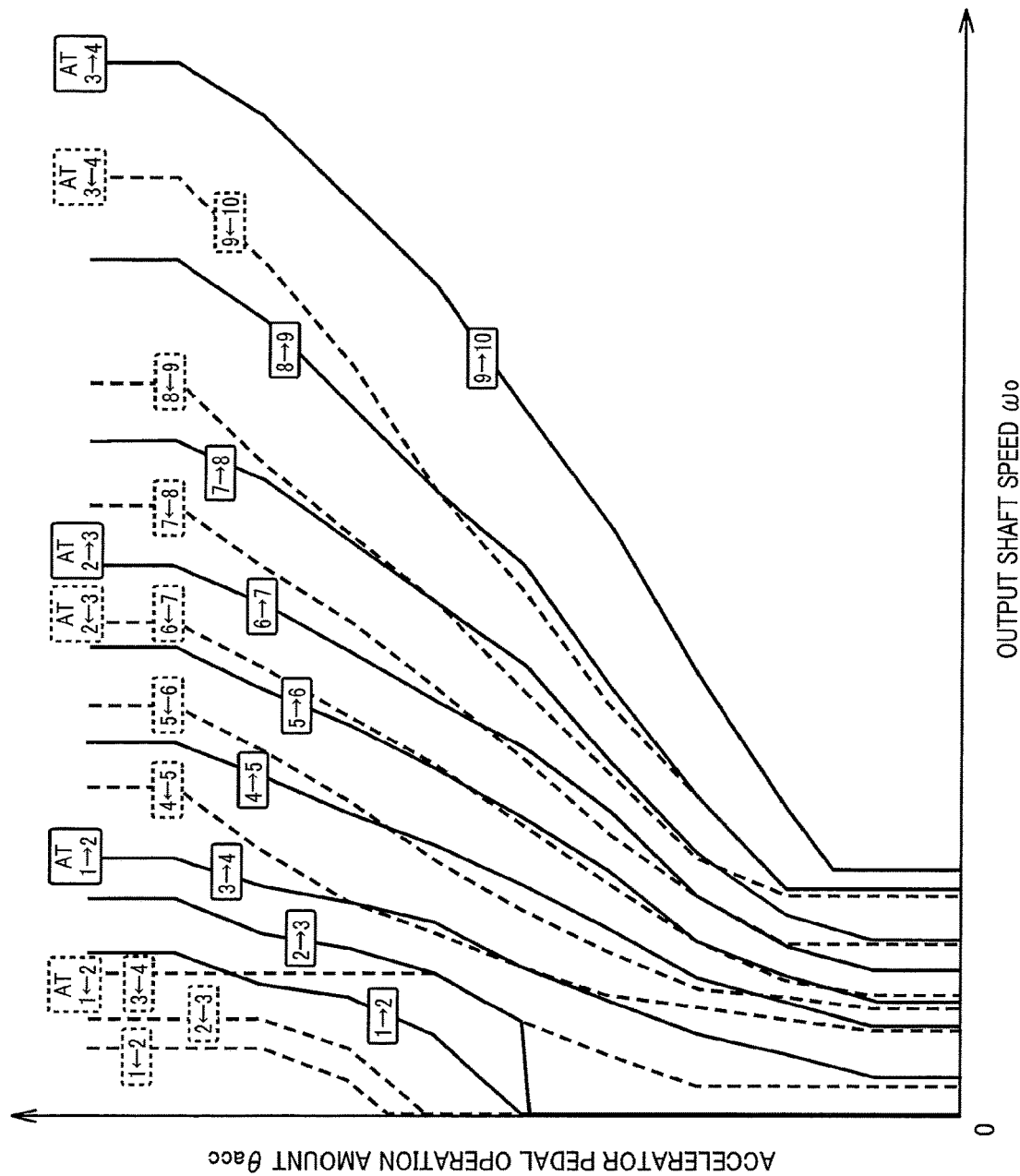
FIG. 6 is a view illustrating an example of an overall speed position shifting map used to shift up and down the transmission device from each of the overall speed positions to the adjacent position or positions.

Like the AT gear position shifting map, the above-indicated overall speed position shifting map is a relationship between the output shaft speed ωo and the accelerator pedal operation amount θacc used as parameters. FIG. 6 is the view illustrating an example of the overall speed position shifting map. In FIG. 6, solid lines indicate shift-up boundary lines while broken lines indicate shift-down boundary lines. The transmission device 40 consisting of the continuously variable transmission portion 18 and the step-variable transmission portion 20 which are disposed in series with each other is shifted from one of the overall speed positions to another according to the overall speed position shifting map, as if the transmission device 40 was shifted like a step-variable transmission as a whole. This overall step-variable shifting control to control the shifting actions of the transmission device 40 as the step-variable transmission as a whole may be implemented preferentially to the continuously variable shifting control of the transmission device 40 as the continuously variable transmission as a whole, only when a sporty drive mode or any other high-drivability drive mode is selected by the vehicle operator, or only when the required drive torque Tdem is comparatively large, but may be principally implemented except where the overall step-variable shifting control is restricted or inhibited.

The overall step-variable shifting control by the hybrid control portion 84 and the shifting control of the step-variable transmission portion 20 by the transmission shifting control portion 82 are implemented in cooperation with each other. In this embodiment, the first through tenth overall speed positions are established for the first through fourth speed AT gear positions. When the transmission device 40 is shifted between the fourth overall speed position and the third overall speed position, for example, the step-variable transmission portion 20 is shifted between the second speed AT gear position and the first speed AT gear position. When the transmission device 40 is shifted between the seventh overall speed position and the sixth overall speed position, the step-variable transmission portion 20 is shifted between the third speed AT gear position and the second speed AT gear position. When the transmission device 40 is shifted between the tenth overall speed position and the ninth overall speed position, the step-variable transmission portion 20 is shifted between the fourth speed AT gear position and the third speed AT gear position. Therefore, the AT gear position shifting map is formulated so that the AT gear position shifting operation is performed in synchronization with the overall speed position shifting operation. Described more specifically by reference to FIG. 6, shift-up boundary lines for respectively shifting the transmission device 40 from the third overall speed position to the fourth overall speed position, from the sixth overall speed position to the seventh overall speed position, and from the ninth overall speed position to the tenth overall speed position coincide with shift-up boundary lines for respectively shifting the step-variable transmission portion 20 from the first speed AT gear position to the second speed AT gear position (indicated as "AT1→2" in FIG. 6), from the second speed AT gear position to the third speed AT gear position, and from the third speed AT gear position to the fourth speed AT gear position. Similarly, shift-down boundary lines for respectively shifting the transmission device 40 from the fourth overall speed position to the third overall speed position, from the seventh overall speed position to the sixth overall speed position, and from the tenth overall speed position to the ninth overall speed position coincide with shift-down boundary lines for respectively shifting the step-variable transmission portion 20 from the second speed AT gear position to the first speed AT gear position (indicated as "AT1←2" in FIG. 6), from the third speed AT gear position to the second speed AT gear position, and from the fourth speed AT gear position to the third speed AT gear position. Alternatively, a command to shift the step-variable transmission portion 20 may be applied to the transmission shifting control portion 82 in response to a determination according to the overall speed position shifting map of FIG. 6 that the transmission device 40 should be shifted from one overall speed position to another. Thus, the transmission shifting control portion 82 commands the step-variable transmission portion 20 to perform a shifting action from one AT gear position to another, for shifting the transmission device 40 from one overall speed position to another. Since the AT gear position shifting operation is performed in synchronization with the overall speed position shifting operation, the shifting action of the step-variable transmission portion 20 is performed with a change of the engine speed ωe, so that the vehicle operator is less likely to uncomfortably recognize a shifting shock of the step-variable transmission portion 20.

The hybrid control portion 84 selectively establishes the motor drive mode or the hybrid drive mode, depending upon a running state of the vehicle 10. For example, the hybrid control portion 84 selects the motor drive mode when the required vehicle drive power Pdem is lower than a predetermined threshold value, that is, within a predetermined motor drive mode range, and selects the hybrid drive mode when the required vehicle drive power Pdem is equal to or higher than the threshold value, that is, within a predetermined hybrid drive mode range. Further, even when the required vehicle drive power Pdem is within the motor drive mode range, the hybrid control portion 84 selects the hybrid drive mode if the electric power amount SOC stored in the battery 52 is smaller than a predetermined threshold value.

The hybrid control portion 84 is configured to control the second motor/generator MG2 to generate the reverse drive MG2 torque TmR according to the accelerator pedal operation amount θacc, with the step-variable transmission portion 20 being placed in the first speed AT gear position while the shift lever 56 is placed in the reverse drive position R.

There will be described a shifting control of the step-variable transmission portion 20 which is implemented when the step-variable transmission portion 20 is shifted down from the second speed AT gear position to the first speed AT gear position in a coasting run of the vehicle 10, which is an example of a coasting shift-down action of the step-variable transmission portion 20 to its forward-drive low-speed gear position. In this coasting shift-down action while the accelerator pedal is placed in the non-operated position, the AT input shaft speed ωi can not be raised from a to a pre-shift-down synchronizing speed ωisyca (=ωo·pre-shift-down speed ratio γata) to a post-shift-down synchronizing speed ωisycb (ω·post-shift-down speed ratio γatb) when the engaging torque Tcb of the engaging-side coupling device CB which is to be brought into the engaged state to establish the forward-drive low-speed gear position is not generated. On the other hand, the AT input shaft speed ωi can be raised to the post-shift-down synchronizing speed ωisycb to permit the shift-down action, by controlling the above-indicated coupling device CB to generate the engaging torque Tcb, or by temporarily increasing the AT input shaft torque Ti transmitted to the input shaft (that is, the intermediate power transmitting member 30) of the step-variable transmission portion 20, above its required value, for example. The present embodiment is configured to implement an ordinary control of the coasting shift-down action of the step-variable transmission portion 20 from the second speed AT gear position to the first speed AT gear position. In this ordinary control, the AT input shaft torque Ti is temporarily increased above the required value in order to carry out the shift-down action by placing both of the releasing-side coupling device CB (brake B1) and the engaging-side coupling device CB (brake B2) in the released state in which the engaging torque Tcb is not generated.

To implement the ordinary control of the coasting shift-down action from the second speed AT gear position to the first speed AT gear position, the transmission shifting control portion 82 is configured to implement a speed synchronizing control during the coasting shift-down action of the step-variable transmission portion 20 from the second speed AT gear position to the first speed AT gear position. In the speed synchronizing control, the forward drive MG2 torque TmF of the second electric motor MG2 is temporarily increased (for example, by commanding the hybrid control portion 84 to temporarily increase the MG2 torque TmF above the required value), for thereby temporarily increasing the input shaft torque Ti transmitted to the step-variable transmission portion 20, to raise the AT input shaft speed ωi from the pre-shift-down synchronizing speed ωisyca (namely, synchronizing speed ωisyc2 in the second speed AT gear position=ωo·speed ratio γat2 of the second speed AT gear position) toward the post-shift-down synchronizing speed ωisycb (namely, synchronizing speed ωisyc1 in the first speed AT gear position=ωo·speed ratio γat1 of the first speed AT gear position). After the AT input shaft speed ωi has been raised to a predetermined value, the engaging-side coupling device (brake B2 which was placed in its released state before the shift-down action) is brought into its engaged state, which corresponds to a shifting control in the shift-down action. The predetermined value indicated above is a threshold value above which the AT input shaft speed ωi is considered to be high enough to permit reduction of a shifting shock of the step-variable transmission portion 20 even where the engaging-side coupling device CB is abruptly brought into the engaged state. This threshold value may be set to be equal to the synchronizing speed ωisyc1 in the first speed AT gear position, or a value which is lower than, but close to the synchronizing speed ωisyc1.

The transmission shifting control portion 82 temporarily increases the forward drive MG2 torque TmF, to temporarily increase the AT input shaft torque Ti above the required value. For example, this required value of the AT input shaft torque Ti is a value obtained by conversion of the required drive torque Tdem into a torque value of the intermediate power transmitting member 30. Since the accelerator pedal is placed at the non-operated position during the coasting shift-down action, the required value of the AT input shaft torque Ti is set, for example, to be almost equal to a so-called "creep torque" which enables the vehicle 10 to slowly move in a creeping manner.

Figure 7:
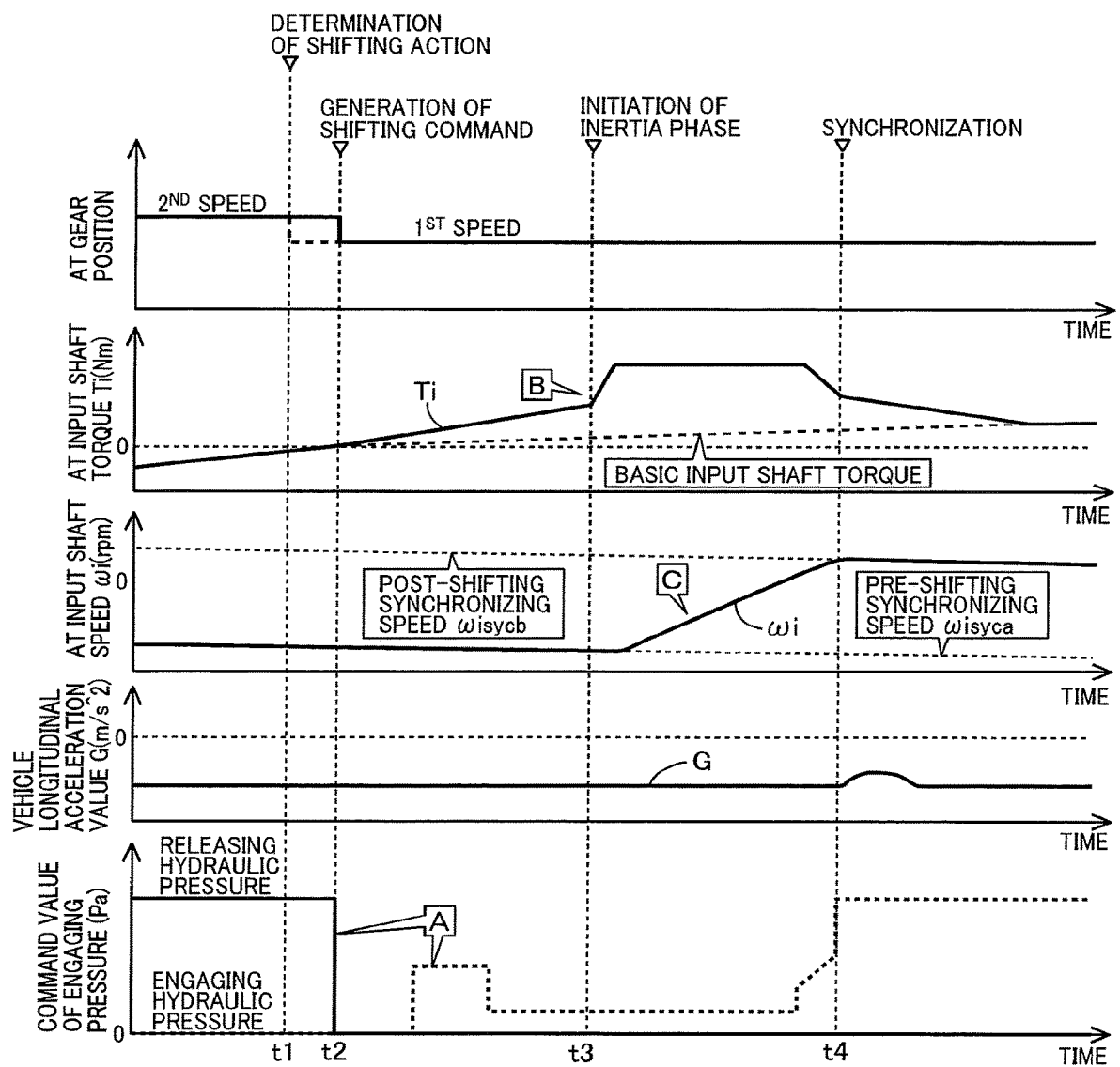
FIG. 7 is a time chart illustrating an example of changes of various parameters when the transmission device is controlled according to an ordinary control implemented during a shift-down action of the step-variable transmission portion from its second speed gear position to its first speed gear position in a coasting run of the vehicle.

FIG. 7 is the time chart illustrating an example of changes of various parameters when the transmission device 40 is controlled according to the ordinary control implemented by the transmission shifting control portion 82 during the coasting shift-down action of the step-variable transmission portion 20 from the second speed AT gear position to the first speed AT gear position. In the example of FIG. 7, a determination of requirement for the coasting shift-down action of the step-variable transmission portion 20 from the second speed AT gear position to the first speed AT gear position is made at a point of time t1 (as indicated by a broken line in a graph of "AT GEAR POSITION"), and a shifting command to implement the coasting shift-down action is generated at a point of time t2 (as indicated by a solid line in the graph of "AT GEAR POSITION"). When the shifting command is generated, a command pressure value (releasing hydraulic pressure indicated by a solid line) corresponding to the engaging torque Tcb of the releasing-side coupling device CB is abruptly lowered to bring the releasing-side coupling device CB into the released state, while a command pressure value (engaging hydraulic pressure indicated by a broken line) corresponding to the engaging torque Tcb of the engaging-side coupling device CB is controlled so as to follow a pattern of change to substantially fill its hydraulic cylinder with the working fluid, and is held at a value slightly lower than a value at which the engaging-side coupling device CB actually has the predetermined engaging torque Tcb (as indicated by an arrow symbol "A"). The AT input shaft torque Ti is subjected to the speed synchronizing control, that is, is controlled to be temporarily increased above its required value while both of the releasing-side and engaging-side coupling devices CB do not actually have the engaging torque Tcb (as indicated by an arrow symbol "B"). A basic input shaft torque indicated by a broken line in a graph of "AT INPUT SHAFT TORQUE" is a torque which is equal to the required AT input shaft torque value minus a driven torque acting on the intermediate power transmitting member 30 (i.e. a torque received from the drive wheels 28). Since the driven torque decreases with a decrease of the vehicle running speed V, the basic input shaft torque increases with the decrease of the vehicle running speed V, as long as the required AT input shaft torque value is held unchanged.

As a result of the above-indicated speed synchronizing control, a rise of the AT input shaft speed ωi toward the post-shift-down synchronizing speed ωisycb is initiated, and an inertia phase of the coasting shift-down action is initiated (at a point of time t3), whereby the coasting shift-down action of the step-variable transmission portion 20 progresses (as indicated by an arrow symbol "C"). When the AT input shaft speed ωi has been raised to the predetermined value substantially equal to the post-shift-down synchronizing speed ωisycb, the engaging hydraulic pressure of the engaging-side coupling device CB (indicated by the broken line) is abruptly increased to bring the engaging-side coupling device CB into the engaged state (during a time period from a point of time immediately prior to a point of time t4, to the point of time t4). The speed synchronizing control is terminated after completion of the engaging action of the engaging-side coupling device CB (after the point of time t4). Since the engaging-side coupling device CB is brought into the engaged state when the AT input shaft speed ωi has been raised to a value substantially equal to the post-shift-down synchronizing speed ωisycb, it is possible to reduce a degree of the shifting shock (represented by a change of the vehicle longitudinal acceleration value G after the point of time t4) of the step-variable transmission portion 20 generated due to an abrupt engaging action of the engaging-side coupling device CB.

By the way, the engaging-side or releasing-side coupling devices CB has a certain amount of engaging torque Tcb depending upon the lubricant temperature Toil, during the coasting shift-down action of the step-variable transmission portion 20, even when the coupling device CB is placed in the released state. Each of the coupling devices CB of the step-variable transmission portion 20 has frictional coupling elements in the form of a plurality of friction plates, and the lubricant is supplied between the adjacent friction plates. Accordingly, the relative rotary motions of the adjacent friction plates of the engaging-side coupling device CB placed in the released state cause generation of a dragging torque in the presence of the viscous lubricant between the adjacent friction plates. Further, the step-variable transmission portion 20 as a whole has a dragging torque Tloss due to the dragging torque generated in each of the coupling devices CB. This dragging torque Tloss is a dragging loss acting on the step-variable transmission portion 20 in the direction to prevent a rise of the input shaft speed ωi of the step-variable transmission portion 20 with the input shaft torque Ti. In this respect, it is noted that the dragging torque Tloss increases with a decrease of the lubricant temperature Toil, since the viscosity of the lubricant increases with a decrease of the lubricant temperature Toil. Accordingly, the dragging torque Tloss generated in the step-variable transmission portion 20 during its coasting shift-down action is comparatively large when the lubricant temperature Toil is comparatively low. Therefore, the input shaft torque Ti that would be transmitted to the step-variable transmission portion 20 at the normal value of the lubricant temperature Toil could not sufficiently raise the input shaft speed ωi of the step-variable transmission portion 20, giving rise to a problem that the coasting shift-down action does not progress or take places in a reverse direction, in the inertia phase of the coasting shift-down action.

Figure 8:
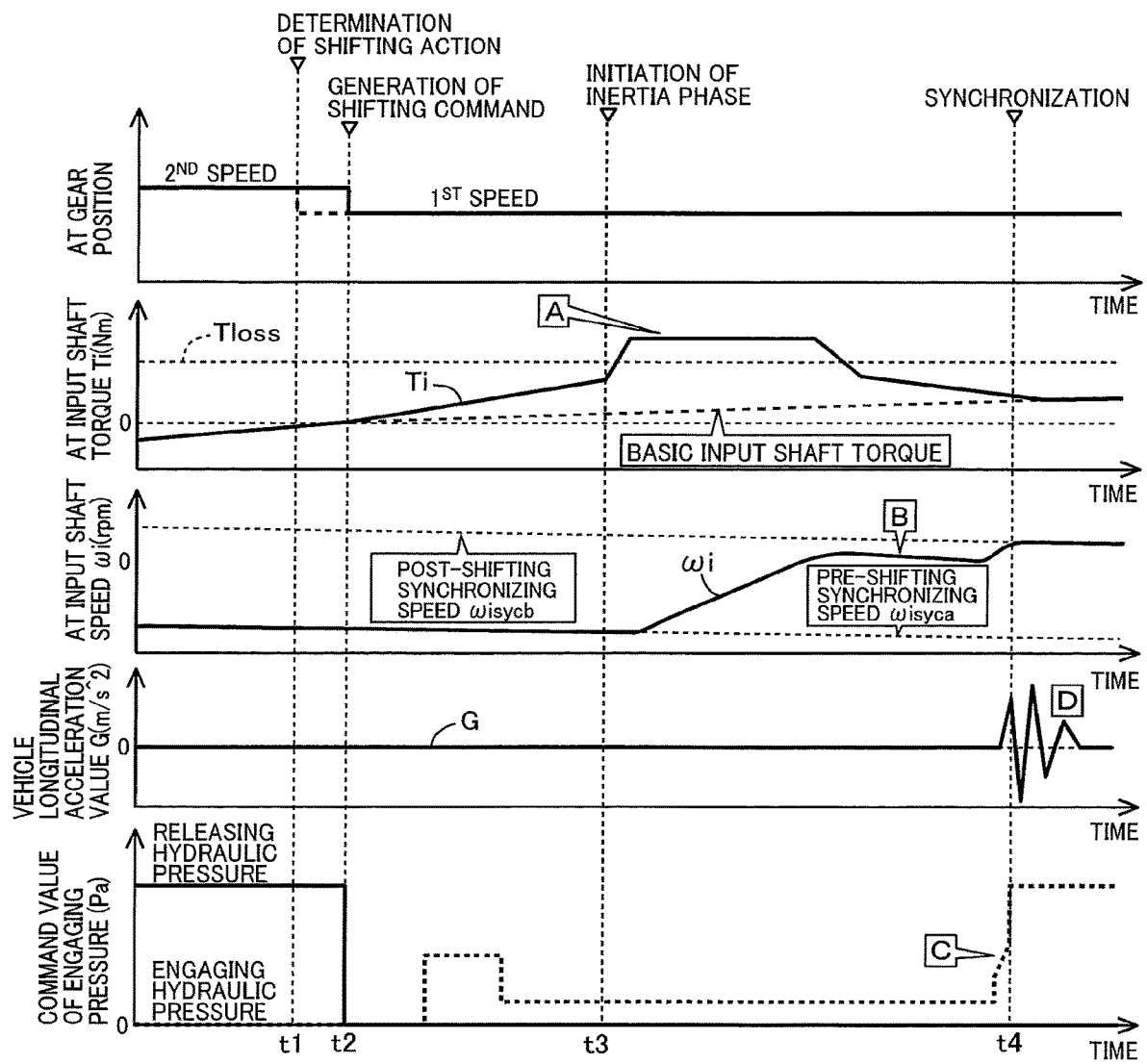
FIG. 8 is a time chart illustrating an example of changes of the various parameters when the shift-down action of the step-variable transmission portion from its second speed gear position to the first speed gear position in the coasting run of the vehicle is controlled according to the prior art, when a lubricant in the step-variable transmission portion has a comparatively low temperature.

FIG. 8 is the time chart illustrating an example of changes of the various parameters during the coasting shift-down action of the step-variable transmission portion 20 from its second speed AT gear position to the first speed AT gear position, when the lubricant in the step-variable transmission portion 20 has a comparatively low temperature Toil, in the case where the input shaft torque Ti transmitted to the step-variable transmission portion 20 in the inertia phase is the same as that at the normal value of the lubricant temperature Toil. In the example of FIG. 8, a determination of requirement for the coasting shift-down action of the step-variable transmission portion 20 from the second speed AT gear position to the first speed AT gear position is made at a point of time t1 (as indicated by a broken line in a graph of "AT GEAR POSITION"), and a shifting command to implement the coasting shift-down action is generated at a point of time t2 (as indicated by a solid line in the graph of "AT GEAR POSITION"). At point of time t3, the inertia phase of the coasting shift-down action is initiated. During a time period from the point of time t3, the input shaft torque Ti at the normal lubricant temperature Toil is transmitted to the step-variable transmission portion 20 (as indicated by an arrow symbol "A"). In this case, the dragging torque Tloss generated in the step-variable transmission portion 20 is comparatively large in connection with the lubricant temperature Toil being comparatively low. Therefore, the dragging torque Tloss becomes larger than the input shaft torque Ti, at a certain point of time during the time period of the inertia phase, and the coasting shift-down action does not progress, or takes place in a reverse direction (with a drop of the input shaft speed ωi) (as indicated by an arrow symbol "B"), giving rise to a problem of difficulty of the input shaft speed of to be raised to the post-shift-down synchronizing speed ωisycb.

In view of the problem described above, the transmission shifting control portion 82 is configured to implement a backup control in which the engaging hydraulic pressure of the engaging-side coupling device CB is raised to generate the engaging torque Tcb to raise the input shaft speed ωi to the post-shift-down synchronizing speed ωisycb, for thereby completing the coasting shift-down action of the step-variable transmission portion 20, if the rise of the input shaft speed ωi to the post-shift-down synchronizing speed ωisycb is not detected even when a watching time for the backup control having predetermined length has passed after the moment of initiation of the coasting shift-down action of the step-variable transmission portion 20. When the lubricant temperature Toil is comparatively low, the backup control is implemented to abruptly bring the engaging-side coupling device CB into the engaged state (as indicated by an arrow symbol "C"), since the coasting shift-down action would not otherwise adequately progress or take place in the reverse direction. As a result, there arises a shifting shock of the step-variable transmission portion 20 involving the generation of the dragging torque Tloss and the engaging shock (synchronizing shock), due to the abrupt engaging action of the engaging-side coupling device CB (as indicated by a symbol "D").

In the present embodiment, the electronic control device 80 includes the torque control portion 86, as described above. The torque control portion 86 is operated during the coasting shift-down action, and is configured to change the input shaft torque Ti of the step-variable transmission portion 20 during its speed synchronizing control, on the basis of the lubricant temperature Toil of the step-variable transmission portion 20.

The torque control portion 88 changes the input shaft torque Ti received from the second electric motor MG2 on the basis of the lubricant temperature Toil of the step-variable transmission portion 20, during the speed synchronizing control implemented after the moment of initiation of the inertia phase. Described more specifically, the torque control portion 86 changes the input shaft torque Ti such that the input shaft torque Ti is larger when the lubricant temperature Toil is lower than a predetermined value α (described below) than when the lubricant temperature Toil is higher than the predetermined value α. Thus, the input shaft torque Ti is made comparatively large when the lubricant temperature Toil is comparatively low, making it possible to reduce the risk that the coasting shift-down action does not adequately progress or takes place in the reverse direction.

The lubricant temperature determining portion 86 is configured to detect the temperature Toil of the lubricant supplied to the coupling devices CB (frictional coupling elements) of the step-variable transmission portion 20, and to determine whether or not the detected lubricant temperature Toil is equal to or lower than the predetermined value α. This predetermined value α is obtained by experimentation or analysis, and is set, for example, to be equal or close to a lower limit threshold below which the input shaft speed ωi is not raised to the post-shift-down synchronizing speed ωisycb (namely, the coasting shift-down action of the step-variable transmission portion 20 does not adequately progress) with a predetermined reference value (Tist) of the input shaft torque Ti (hereinafter referred to as "reference input shaft torque "Tist") being transmitted to the step-variable transmission portion 20 during its coasting shift-down action, even when a predetermined length of time has passed after the moment of initiation of the coasting shift-down action of the step-variable transmission portion 20. The reference input shaft torque Tist is determined to correspond to the normal value of the lubricant temperature Toil at which the vehicle 10 can be adequately driven. The predetermined length of time is set to similar to the watching time for the backup control.

Accordingly, when the lubricant temperature Toil is higher than the predetermined value α, the reference input shaft torque Tist transmitted to the step-variable transmission portion 20 during the speed synchronizing control permits an adequate progress of the coasting shift-down action (adequate speed synchronization), without generation of a shifting shock of the step-variable transmission portion 20. Therefore, the torque control portion 86 sets the reference value Tist as the input shaft torque Ti transmitted to the step-variable transmission portion 20 during the speed synchronizing control. When the lubricant temperature Toil is not higher than the predetermined value α, on the other hand, the reference input shaft torque Tist transmitted to the step-variable transmission portion 20 causes the backup control to be initiated, giving rise to a risk of generation of a shifting shock of the step-variable transmission portion 20 during its coasting shift-down action. To reduce this risk, the torque control portion 86 increases the input shaft torque Ti above the reference value Tist during the speed synchronizing control when the lubricant temperature Toil is not higher than the predetermined value α.

The torque control portion 86 sets a target value of the input shaft torque Ti (hereinafter referred to as "target input shaft torque Ti*) after the moment of initiation of the inertia phase, and controls the MG2 torque TmF so that the input shaft torque Ti coincides with the target value Ti*. For example, the torque control portion 86 sets the target input shaft torque Ti* to be equal to the reference input shaft torque Tist when the lubricant temperature Toil is higher than the predetermined value α, and sets the target input shaft torque Ti* to be larger than the reference input shaft torque Tist and the dragging torque Tloss generated in the step-variable transmission portion 20 when the lubricant temperature Toil is lower than the predetermined value α.

The amount of the dragging torque Tloss to be generated in the step-variable transmission portion 20 can be obtained by experimentation. The target input shaft torque Ti* is set by taking account of the dragging torque Tloss, to prevent the risk that the coasting shift-down action does not adequately progress or takes place in the reverse direction. The target input shaft torque Ti* is set to be larger than the dragging torque Tloss. After the moment of initiation of the inertia phase, the torque control portion 86 controls the input shaft torque Ti so as to coincide with the target value Ti*, whereby the controlled input shaft torque Ti is made larger than the dragging torque Tloss.

Figure 9:
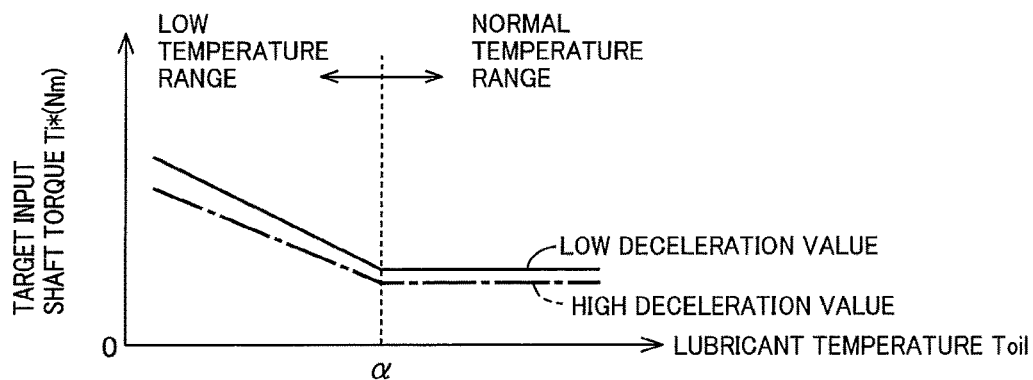
FIG. 9 is a view illustrating an example of a map used to determine an input shaft torque of the step-variable transmission portion on the basis of the temperature of the lubricant.

It is further noted that the dragging torque Tloss increases with a decrease of the lubricant temperature Toil, so that the target input shaft torque Ti* is changed according to the lubricant temperature Toil. For example, the torque control portion 86 stores a map as shown in FIG. 9, which is used to determine the target input shaft torque Ti* on the basis of the lubricant temperature Toil as a parameter. Namely, the torque control portion 86 determines the target input shaft torque Ti* according to the lubricant temperature Toil detected by the lubricant temperature sensor 78, and according to the map of FIG. 9 representing a relationship between the target input shaft torque Ti* and the lubricant temperature Toil. As indicated by a solid line in FIG. 9, the target input shaft torque Ti* is held constant when the lubricant temperature Toil is higher than the predetermined value α (falls within a normal temperature range), since the dragging torque Tloss generated in the step-variable transmission portion 20 in the normal temperature range is comparatively small so that there is almost no risk that the coasting shift-down action of the step-variable transmission portion 20 does not adequately progress. On the other hand, the target input shaft torque Ti* increases with a decrease of the lubricant temperature Toil, in a low temperature range lower than the predetermined value α, since the dragging torque Tloss generated in the step-variable transmission portion 20 increases with the decrease of the lubricant temperature Toil and a consequent increase of the viscosity of the lubricant.

The target input shaft torque Ti* is determined by taking account of a deceleration value G' corresponding to a negative value of longitudinal acceleration G of the vehicle 10, as well as the lubricant temperature Toil. In FIG. 9, the solid line represents the target input shaft torque Ti* when the deceleration value G' is equal to or lower than a predetermined value β (when the deceleration value G' is comparatively low), while a chain line represents the target input shaft torque Ti* when the deceleration value G' is higher than the predetermined value β (when the deceleration value G' is comparatively high). As indicated in FIG. 9, the target input shaft torque Ti* is set to be smaller when the deceleration value G' is higher than the predetermined value β (is comparatively high) than when the deceleration value G' is not higher than the predetermined value β (is comparatively low). In this respect, it is noted that when the deceleration value G' is comparatively high, the post-shift-down synchronizing speed ωisycb is comparatively low, so that there is a comparatively low risk that the shift-down action does not adequately progress or takes place in the reverse direction. Accordingly, the torque control portion 86 is configured to set the input shaft torque Ti after the moment of initiation of the inertia phase such that the input shaft torque Ti is comparatively smaller when the deceleration value G' is comparatively high than when the deceleration value G' is comparatively low. In the example of FIG. 9, the target input shaft torque Ti* is changed in two steps depending upon whether the deceleration value G' is higher or lower than the predetermined value β. However, the target input shaft torque Ti* may be changed in three or more steps according to the deceleration value G', or may be changed continuously according to the deceleration value G' (may decrease with an increase of the deceleration value G').

The torque control portion 86 holds the input shaft torque Ti of the step-variable transmission portion 20 above its dragging torque Tloss until the input shaft speed ωi has been raised to the predetermined value (or to a value close to the predetermined value) at which the input shaft speed ωi is considered to be equal to the post-shift-down synchronizing speed ωisycb. Namely, the torque control portion 86 sets the target value Ti* of the input shaft torque Ti to be larger than the dragging torque Tloss of the step-variable transmission portion 20 during the time period from the moment of initiation of the inertia phase to a moment at which the input shaft speed ωi is raised to the post-shift-down synchronizing speed ωisycb (or to a value close to the synchronizing speed ωisycb). Accordingly, the input shaft torque Ti is held larger than the dragging torque Tloss during the inertia phase, making it possible to reduce the risk that the shift-down action does not adequately progress or takes place in the reverse direction. After the moment of the rise of the input shaft speed ωi to the post-shift-down synchronizing speed ωisycb, the torque control portion 86 sets the target input shaft torque Ti* to be equal to the dragging torque Tloss, for instance.

When the electric power amount SOC stored in the battery 52 is smaller than a predetermined value or the temperature THbat of the battery 52 is comparatively low or high, for example, the maximum discharging electric power amount Wout is limited, so that it is difficult for the second electric motor MG2 to generate the predetermined target input shaft torque Ti*. In this case, the torque control portion 86 implements a control wherein a shortage of the MG2 torque TmF of the second electric motor MG2 is compensated for by the engine torque Te, to permit generation of the target input shaft torque Ti*. For example, the torque control portion 86 directly commands the engine control device 58, or commands the engine control device 58 through the hybrid control portion 84, to control the engine 14 to generate the engine torque Te necessary to generate the target input shaft torque Ti*. It is noted that while the maximum discharging electric power amount Wout to be supplied to the second electric motor MG2 is limited, the target input shaft torque Ti* may be generated solely by the engine 14.

Figure 10:
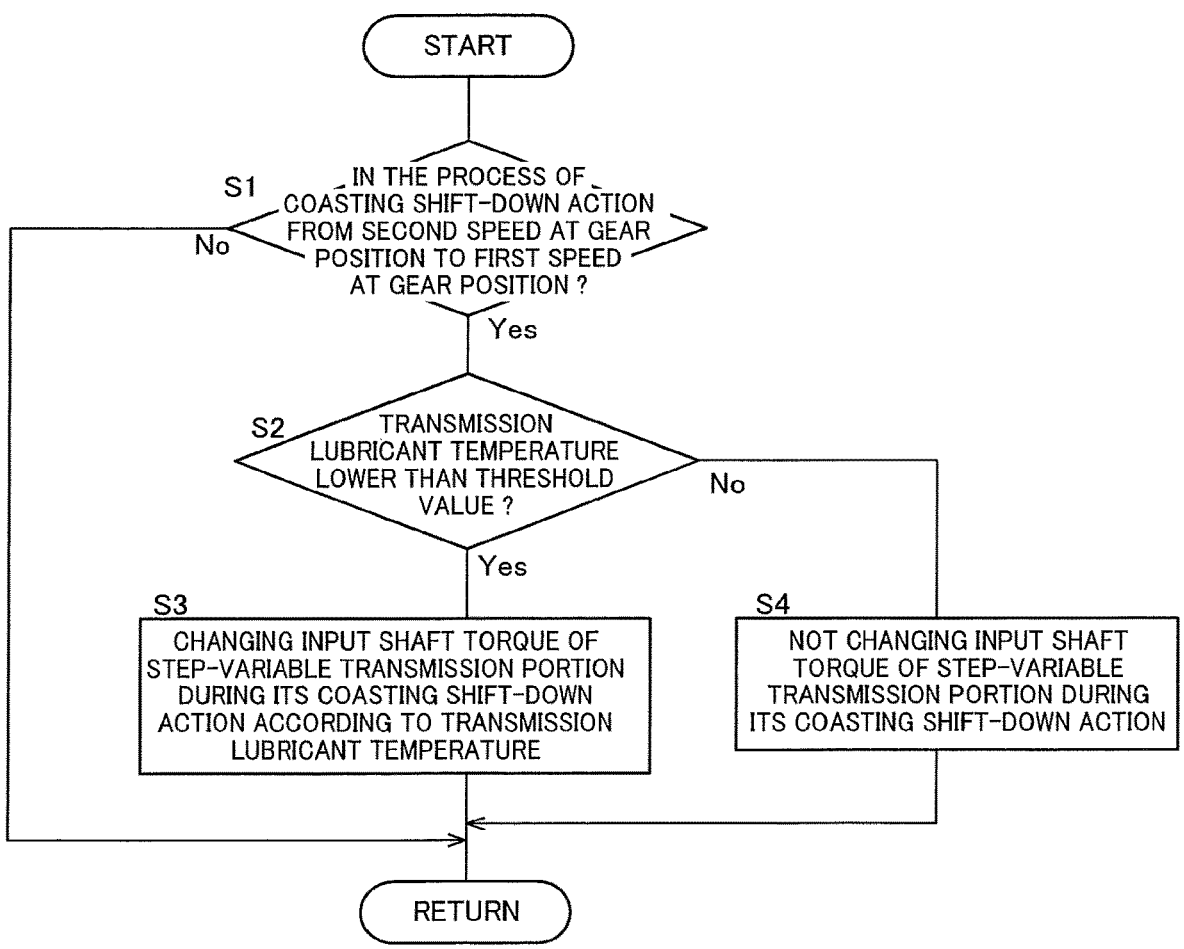
FIG. 10 is a flow chart illustrating an essential part of a control routine executed by the electronic control device of FIG. 1, namely, a control operation to reduce a dragging loss or a synchronizing shock of the step-variable transmission portion, which takes pace during its shift-down action in the coasting run of the vehicle.
Figure 11:
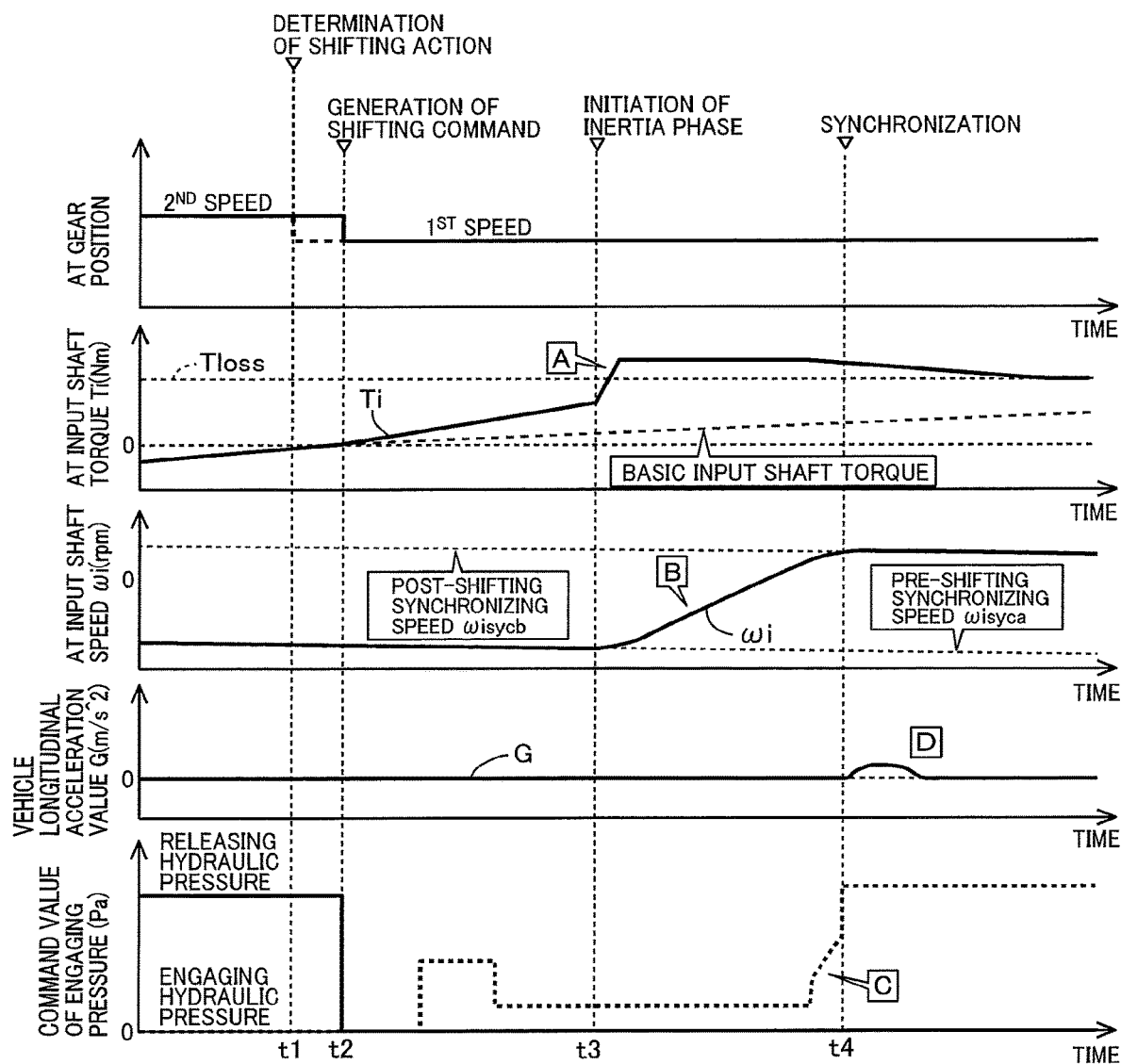
FIG. 11 is a time chart illustrating an example of changes of the various parameters when the control routine illustrated in the flow chart of FIG. 10 is executed.

FIG. 10 is the flow chart illustrating an essential part of a control routine executed by the electronic control device 80, namely, a control operation to reduce the shifting shock of the step-variable transmission portion 20, which takes pace during its coasting shift-down action. This control routine is repeatedly executed during running of the vehicle 10. FIG. 11 is the time chart illustrating an example of changes of the various parameters when the control routine illustrated in the flow chart of FIG. 10 is executed.

The control routine of FIG. 10 is initiated with a step S1 (hereinafter "step" may be omitted) corresponding to the function of the transmission shifting control portion 82, to determine whether the step-variable transmission portion 20 is in the process of the coasting shift-down action (specifically, from the second speed AT gear position to the first speed AT gear position). If a negative determination is obtained in the step S1, that is, the step-variable transmission portion 20 is not in the process of the coasting shift-down action, one cycle of execution of the present control routine is terminated. If an affirmative determination is obtained in the step S1, that is, the step-variable transmission portion 20 is in the process of the coasting shift-down action, the control flow goes to a step S2 also corresponding to the function of the lubricant temperature determining portion 88, to determine whether the lubricant temperature Toil is comparatively low or not. This determination is made depending upon whether or not the lubricant temperature Toil is equal to or lower than the predetermined value α. If a negative determination is made in the step S2, that is, the lubricant temperature Toil is higher than the predetermined value α, the control flow goes to a step S4. If an affirmative determination is obtained in the step S2, that is, the lubricant temperature Toil is equal to or lower than the predetermined value α, the control flow goes to a step S3.

In the step S4 corresponding to the function of the torque control portion 86, the input shaft torque Ti of the step-variable transmission portion 20 is temporarily increased during the speed synchronizing control initiated upon the coasting shift-down action of the step-variable transmission portion 20, so that the coasting shift-down action adequately progresses. At this time, the input shaft torque Ti of the step-variable transmission portion 20 is controlled to coincide with the reference input shaft torque Tist predetermined for the normal range of the lubricant temperature Toil (Toil>α). Namely, the input shaft torque Ti is not changed according to the lubricant temperature Toil when the lubricant temperature Toil is ordinary (i.e. Toil>α). It is noted that the step S4 corresponds to the normal control illustrated in FIG. 7.

In the step S3 also corresponding to the function of the torque control portion 86, the input shaft torque Ti of the step-variable transmission portion 20 is changed according to the lubricant temperature Toil, during the speed synchronizing control initiated upon the coasting shift-down action of the step-variable transmission portion 20 (during its inertia phase). The inertia phase is initiated at a point of time t3 indicated in FIG. 11, and the input shaft torque Ti is controlled by taking account of the dragging torque Tloss of the step-variable transmission portion 20. Described more specifically, the input shaft torque Ti is controlled (as indicated by an arrow symbol "A") to be a value which is larger than the dragging torque Tloss and at which the shift-down action adequately progresses irrespective of a change to the comparatively low value of the lubricant temperature Toil, as if the lubricant temperature Toil was in the normal range. Accordingly, the input shaft speed ωi during the inertia phase can be changed (as indicated by an arrow symbol "B") in the same manner as when the lubricant temperature Toil is in the normal range. As a result, the engaging hydraulic pressure of the engaging-side coupling device CB is raised (as indicated by an arrow symbol "C") at substantially the same timing as when the lubricant temperature Toil is in the normal range, without implementation of the backup control, making it possible to prevent the risk that the shift-down action does not adequately progress or takes place in the reverse direction, while reducing the shifting shock as if the lubricant temperature Toil was in the normal range (as indicated by a symbol "D").

As described above, the present embodiment is configured such that the input shaft torque Ti transmitted to the intermediate power transmitting member 30 of the step-variable transmission portion 20 during its coasting shift-down action is made larger when the lubricant temperature Toil is comparatively low than when the lubricant temperature Toil is comparatively high, so that the step-variable transmission portion 20 can be given the input shaft torque Ti sufficient to permit an adequate progress of the coasting shift-down action, even when the dragging torque Tloss (dragging loss) of the step-variable transmission portion 20 is comparatively large when the lubricant temperature Toil is comparatively low. Accordingly, it is possible to reduce the risk that the coasting shift-down action does not adequately progress or takes place in the reverse direction when the lubricant temperature Toil is comparatively low, making it possible to reduce the shifting shock of the step-variable transmission portion 20 due to an increase of the dragging loss of the step-variable transmission portion 20, and to improve the drivability of the vehicle 10. Further, the input shaft torque Ti is increased above the dragging torque Tloss generated in the step-variable transmission portion 20 after the moment of initiation of the inertia phase, making it possible to reduce the risk that the coasting shift-down action does not adequately progress or takes place in the reverse direction during the inertia phase. In addition, in view of the fact that the risk that the coasting shift-down action does not adequately progress or takes place in the reverse direction is lower when the deceleration value G' of the vehicle 10 is comparatively low than when the deceleration value G' is comparatively high, the input shaft torque Ti is made smaller when the deceleration value G' of the vehicle 10 is comparatively high than when the deceleration value G' is comparatively low, so that the shifting shock of the step-variable transmission portion 20 due to an excessive increase of the input shaft torque Ti can be reduced, and deterioration of the fuel economy of the vehicle 10 due to the excessive increase of the input shaft torque Ti can also be reduced.

While the preferred embodiment of this invention has been described in detail by reference to the drawings, it is to be understood that the invention may be otherwise embodied.

Second Embodiment

Figure 12:
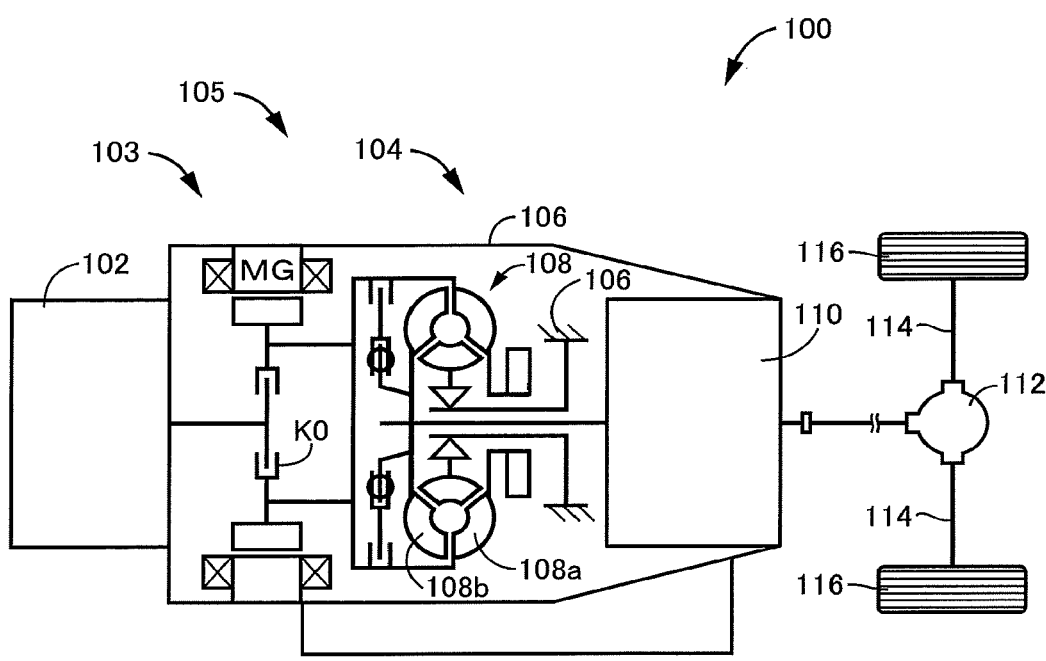
FIG. 12 is a schematic view showing an arrangement of another type of vehicular drive system different from that of FIG. 1, which is to be controlled by the control apparatus according to the present invention.

In the preceding first embodiment, the control apparatus is configured to control the vehicle 10 provided with the continuously variable transmission portion 18 and the step-variable transmission portion 20 which are disposed in series with each other. However, the control apparatus according to the present invention may be configured to control a vehicle 100 shown in FIG. 12. The vehicle 100 is a hybrid vehicle provided with a drive power source portion 103 as the power source comprising an engine 102 and an electric motor MG, and a vehicular drive system 105 comprising a power transmitting system 104. As shown in FIG. 12, the power transmitting system 104 includes a clutch K0, a torque converter 108 and a step-variable transmission portion 110, which are disposed within a stationary member in the form of a casing 106 fixed to a body of the vehicle 100, in this order of description as seen in the direction from the engine 102. The power transmitting system 104 further includes a differential gear device 112 and axles 114. The torque converter 108 has a pump impeller 108a selectively connected to the engine 102 through the clutch K0 and directly connected to the electric motor MG, and a turbine impeller 108b directly connected to the step-variable transmission portion 110. In the power transmitting system 104, a drive force of the engine 102 and/or a drive force of the electric motor MG are/is transmitted to drive wheels 116 through the clutch K0 (where the drive force of the engine 102 is transmitted), the torque converter 108, the step-variable transmission portion 110, the differential gear device 112 and the axles 114, in this order of description. The step-variable transmission portion 110 is a planetary gear type automatic transmission.

The vehicle 100 may not be provided with the engine 102, the clutch K0 and the torque converter 108. In this case, the electric motor MG is directly connected to an input rotary member of the step-variable transmission portion 110. Namely, the control apparatus according to the present invention is applicable to a vehicle which is provided with a step-variable transmission portion, and a drive power source portion operatively connected to an input shaft of the step-variable transmission portion in a power transmittable manner.

In the illustrated first embodiment, the step-variable transmission portion 20 is a planetary gear type automatic transmission having the four AT gear positions for forward driving of the vehicle 10. However, the step-variable transmission portion 20 need not have the four AT gear positions, as long as the step-variable transmission portion 20 has a plurality of gear positions each of which is selectively established with engagement of selected at least one of a plurality of coupling devices.

In the illustrated embodiments, the coasting shift-down action of the step-variable transmission portion from the second speed AT gear position to the first speed AT gear position is described as a coasting shift-down action. However, the control apparatus according to the invention is equally applicable to control a coasting shift-down action of the step-variable transmission portion from the third speed AT gear position to the second speed AT gear position, or from the fourth speed AT gear position to the third speed AT gear position.

In the illustrated embodiments, the differential mechanism 32 is the planetary gear set of the single-pinion type having the three rotary elements. However, the differential mechanism 32 may be replaced by a differential mechanism including a plurality of planetary gear sets which are connected to each other and which have four or more rotary elements. Alternatively, the differential mechanism 32 may be a planetary gear set of a double-pinion type, or a differential gear device including a pinion rotated by the engine 14 and a pair of bevel gears which mesh with the pinion and which are connected to the first electric motor MG1 and the intermediate power transmitting member 30.

In the illustrated embodiments, the lubricant temperature sensor 78 is attached directly to a lubricant supply conduit. In view of a fact that the working fluid supplied to the hydraulic actuators of the coupling devices CB serves as the lubricant for the coupling devices CB, however, the lubricant temperature sensor 78 may be disposed to detect, as the lubricant temperature Toil, the temperature of the working fluid stored in an oil pan located in a lower part of the step-variable transmission portion 20.

It is to be understood that the embodiments and modifications described above are given for illustrative purpose only, and that the present invention may be embodied with various other changes and improvements which may occur to those skilled in the art.

NOMENCLATURE OF ELEMENTS

12: Vehicular drive system
20: Step-variable transmission portion
30: Input shaft (Intermediate power transmitting member)
39: Drive power source portion
80: Electronic control device (Control apparatus)
CB: Coupling devices
MG2: Second electric motor (Electric motor)

What is claimed is:

1. A control apparatus for a vehicular drive system, provided with a step-variable transmission portion which is shifted to a selected one of a plurality of speed positions having respective speed ratio values, with engaging and releasing actions of a plurality of coupling devices, and a drive power source portion operatively connected to an input shaft of the step-variable transmission portion in a power transmittable manner, the control apparatus being configured to implement a speed synchronizing control upon a shift-down action of the step-variable transmission portion in a coasting run of a vehicle, wherein a rotating speed of the input shaft of the step-variable transmission portion is raised with an input shaft torque transmitted from the drive power source portion to the input shaft, from a pre-shift-down synchronizing speed to a post-shift-down synchronizing speed, said control apparatus comprising:
a torque control portion which is operated during the speed synchronizing control implemented upon the shift-down action of the step-variable transmission portion in the coasting run of the vehicle, and which is configured to change the input shaft torque transmitted from the drive power source portion to the input shaft on the basis of a temperature of a lubricant in the step-variable transmission portion such that the input shaft torque is larger when the temperature of the lubricant is comparatively low than when the temperature is comparatively high,
wherein the torque control portion increases the input shaft torque to a value larger than a dragging torque generated in the step-variable transmission portion, after initiation of an inertia phase of the shift-down action in a coasting run.

2. The control apparatus according to claim 1, wherein the torque control portion sets the input shaft torque such that the input shaft torque is smaller when a deceleration value of the vehicle is comparatively high than when the deceleration value is comparatively low.

3. The control apparatus according to of claim 2, wherein the drive power source portion includes an electric motor.

4. The control apparatus according to of claim 1, wherein the drive power source portion includes an electric motor.

* * * * *